US009209669B2

(12) United States Patent
Mizutani et al.

(10) Patent No.: US 9,209,669 B2
(45) Date of Patent: Dec. 8, 2015

(54) METHOD FOR MANUFACTURING STATOR, APPARATUS FOR MANUFACTURING STATOR, AND STATOR

(71) Applicant: ASMO CO., LTD., Shizuoka-ken (JP)

(72) Inventors: Hiroyuki Mizutani, Hamamatsu (JP); Yoshitsugu Nakagawa, Kosai (JP); Yukihide Ishino, Hamamatsu (JP)

(73) Assignee: ASMO CO., LTD. (JP)

( * ) Notice: Subject to any disclaimer, the term of this patent is extended or adjusted under 35 U.S.C. 154(b) by 329 days.

(21) Appl. No.: 13/723,640

(22) Filed: Dec. 21, 2012

(65) Prior Publication Data
US 2013/0162072 A1 Jun. 27, 2013

(30) Foreign Application Priority Data

Dec. 26, 2011 (JP) ................. 2011-284276

(51) Int. Cl.
*H02K 11/00* (2006.01)
*H02K 15/06* (2006.01)
*H02K 3/34* (2006.01)
*H02K 3/50* (2006.01)
*H02K 3/52* (2006.01)
*H02K 15/00* (2006.01)

(52) U.S. Cl.
CPC .............. *H02K 15/065* (2013.01); *H02K 3/345* (2013.01); *H02K 3/50* (2013.01); *H02K 3/522* (2013.01); *H02K 15/0075* (2013.01); *H02K 2203/03* (2013.01); *Y10T 29/49009* (2013.01); *Y10T 29/53143* (2013.01)

(58) Field of Classification Search
CPC ...... H02K 2201/03; H02K 3/50; H02K 3/345
USPC ....................... 29/596, 732; 310/71
See application file for complete search history.

(56) References Cited

U.S. PATENT DOCUMENTS

| 8,256,100 B2 * | 9/2012 | Mishina et al. ................. 29/732 |
| 2004/0006865 A1 * | 1/2004 | Hartsfield et al. .............. 29/596 |
| 2012/0262014 A1 * | 10/2012 | Katou et al. .................... 310/71 |

FOREIGN PATENT DOCUMENTS

JP          06-233505          8/1994

* cited by examiner

Primary Examiner — Hanh Nguyen
(74) Attorney, Agent, or Firm — Sheridan Ross P.C.

(57) ABSTRACT

A method for manufacturing a stator includes preparing a stator core having a plurality of teeth, a plurality of coils having a plurality of lead lines, a substrate having a plurality of connecting portions, and a plurality of positioning jigs having restraining portions. The method includes positioning the substrate and the lead lines so that distal portions of the lead lines are separated from the connecting portions in at least one of a radial direction and a circumferential direction. The method further includes inserting the lead lines in the restraining portions, aligning the distal portions of the lead lines with the corresponding connecting portions using the positioning jigs, inserting the lead lines into the corresponding connecting portions, and electrically connecting the lead lines inserted in the connecting portions to the corresponding connecting portions.

22 Claims, 12 Drawing Sheets

Fig.2A
Fig.2B
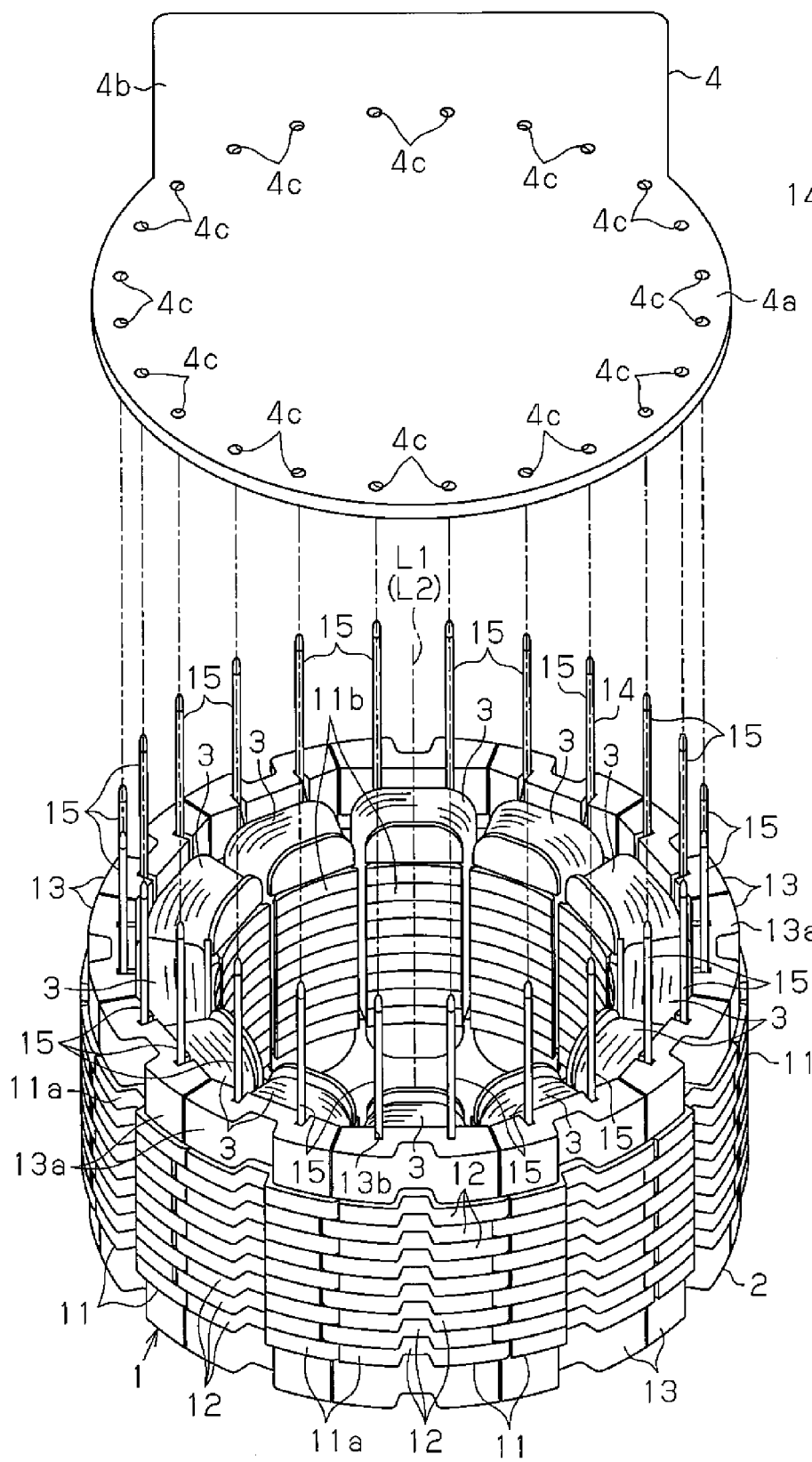
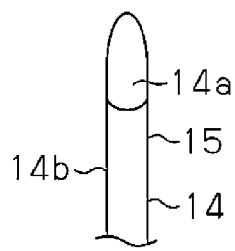

METHOD FOR MANUFACTURING STATOR, APPARATUS FOR MANUFACTURING STATOR, AND STATOR

CROSS REFERENCE TO RELATED APPLICATIONS

This application claims the benefit of Japanese Patent Application No. 2011-284276filed on Dec. 26, 2011, the disclosures of which is incorporated herein by reference.

BACKGROUND OF THE PRESENT INVENTION

The present invention relates to a method for manufacturing a stator including a substrate for connection to coils, an apparatus for manufacturing a stator, and a stator.

A conventional motor includes coils wound around an annular stator core. Each coil includes a winding-initiating ends and winding-terminating end that form lead lines, which are drawn out from one axial end of the stator core. The lead lines are electrically connected to, for example, a substrate arranged on one axial side of the stator core. The substrate electrically connects predetermined ones of the coils. Further, the coils are supplied with excitation current through the substrate.

Japanese Laid-Open Patent Publication No. 06-233505 describes an example of a method for manufacturing such a stator including a substrate. The method uses L-shaped pins to connect lead lines of coils to a substrate arranged at one axial side of the stator core. The stator core includes radially extending teeth and is covered by an insulator. Pins are arranged on one axial end of the insulator. Each pin includes a distal portion, or horizontal portion, extending toward the inner side of the stator core along the radial direction of the stator core. When coils are wound around the teeth from above the insulator by a nozzle of a coil winder, the nozzle winds the lead lines of the coils around the horizontal portions of the pins. After the substrate is set between the horizontal portions and the stator core at one axial side of the stator core, the pins are driven into the insulators to firmly join the horizontal portions with the substrate. Then, the horizontal portions and the lead lines wound around the horizontal portions are soldered to electrically connect the horizontal portions, the lead lines wound around the horizontal portions, and a printed wiring formed on the substrate. This electrically connects the lead lines to the substrate.

However, when the lead lines are connected to the substrate by implementing the method described in the above publication, the task for arranging the pins on the insulator is difficult. Further, the nozzle of the coil winder required to be moved to wind the lead lines around the horizontal portions of the pins. Thus, the movement of the nozzle is complicated. For example, since there are a variety of wire connection patterns, for example, the coils may be wound around the corresponding teeth into a concentrated winding while connecting the lead lines at the winding-initiating and winding-terminating ends of each coil to the substrate. In this case, a large number of lead lines, which is two times the number of the coils, are wound around the horizontal portions of the pins. This lowers the manufacturing efficiency of the stator.

SUMMARY OF THE PRESENT INVENTION

It is an object of the present invention to provide a method for manufacturing a stator, an apparatus for manufacturing a stator, and a stator that allows for each connection of coil lead wires to a substrate.

A first aspect of the present invention is a method for manufacturing a stator. The method includes preparing an annular stator core having a circumferential direction, a radial direction, and an axial direction and including a plurality of teeth arranged in the circumferential direction; and preparing a plurality of coils respectively wound around the teeth. The coils include a plurality of lead lines drawn in a drawing direction toward outside from one axial end of the stator core. The method further includes preparing a substrate that is arranged to face the one axial end of the stator core. The substrate includes a plurality of connecting portions extending through the substrate in a thickness direction of the substrate and electrically connected to the lead lines, respectively. The method further includes positioning the substrate and the lead lines so that distal portions of the lead lines are separated in a separation direction from the corresponding connecting portions. The separation direction is at least one of the radial direction and the circumferential direction. The method also includes preparing a plurality of positioning jigs, each including a recessed restraining portion that receives one of the lead lines. The restraining portion includes an opening directed in a direction opposite to the separation direction of the corresponding lead line. The restraining portion, when receiving the lead line, allows movement of the lead line along the drawing direction and restricts movement of the lead line in a direction orthogonal to the separation direction that differs from the drawing direction. Additionally, the method includes inserting the lead lines into the restraining portions by moving the positioning jigs in the direction opposite to the separation direction; aligning the distal portions of the lead lines with the corresponding connecting portions in the radial direction and the circumferential direction using the positioning jigs; inserting the lead lines into the corresponding connecting portions; and electrically connecting the lead lines, which are inserted into the connecting portions, to the connecting portions.

A second aspect of the present invention is an apparatus for manufacturing a stator. The stator includes an annular stator core having a circumferential direction, a radial direction, and an axial direction and including a plurality of teeth arranged in the circumferential direction. Coils are respectively wound around the teeth. The coils include a plurality of lead lines drawn in a drawing direction toward outside from one axial end of the stator core. A substrate is arranged to face the one axial end of the stator core. The substrate includes a plurality of connecting portions extending through the substrate in a thickness direction of the substrate and electrically connected to the lead lines, respectively. The apparatus includes a substrate holding tool that positions the substrate to face the one axial end of the stator core. The substrate holding tool holds the substrate so that distal portions of the lead lines are separated in a separation direction from the corresponding connecting portions. The separation direction is at least one of the radial direction and the circumferential direction. Positioning jigs each include a recessed restraining portion that receives one of the lead lines. The restraining portion includes an opening directed in a direction opposite to the separation direction of the corresponding lead line. The restraining portion, when receiving the lead line, allows movement of the lead line along the drawing direction and restricts movement of the lead line in a direction orthogonal to the separation direction that differs from the drawing direction. The positioning jigs are moved in the direction opposite to the separation direction to insert the lead lines into the restraining portions, and the positioning jigs then align the distal portions of the lead lines with the corresponding connecting portions in the radial direction and the circumferential direction.

A third aspect of the present invention is a stator including an annular stator core having a circumferential direction, a radial direction, and an axial direction and including a plurality of teeth arranged in the circumferential direction. Coils are respectively wound around the teeth. The coils include a plurality of lead lines drawn in a drawing direction toward outside from one axial end of the stator core. A substrate is arranged to face the one axial end of the stator core. The substrate includes a plurality of connecting portions extending through the substrate in a thickness direction of the substrate and electrically connected to the lead lines, respectively. The lead lines received in the connecting portions are electrically connected to the connecting portions in a state contacting inner surfaces of the connecting portions.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 2A is an exploded perspective view of the stator illustrated in FIG. 1;

FIG. 2B is a partially enlarged view illustrating a distal portion of a lead line illustrated in FIG. 2A;

DETAILED DESCRIPTION OF THE INVENTION

One embodiment of the present invention will now be described with reference to the drawings.

Figure 1:
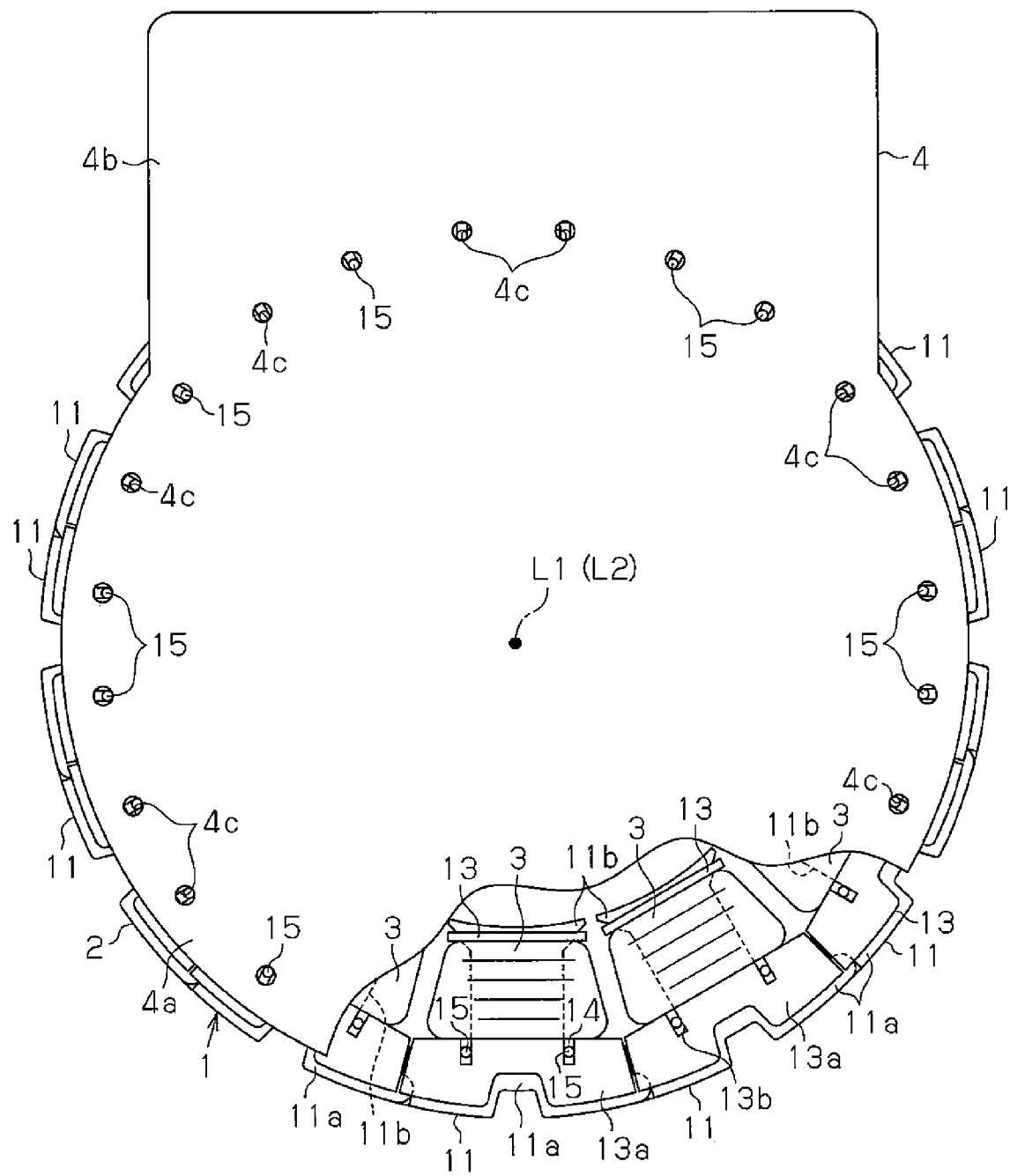
FIG. 1 is a plan view of a stator according to one embodiment of the present invention.

FIG. 1 shows a stator 1 arranged in an inner rotor brushless motor. The stator 1 includes a stator core 2 having an annular shape, a plurality of coils 3 (12 coils) wound around the stator core 2, and a substrate 4 to which the coils 3 are electrically connected.

As illustrated in FIGS. 1 and 2A, the stator core 2 is annular and includes twelve core segments 11, which are T-shaped as viewed from an axial direction and circumferentially coupled with one another. The core segments 11 each include a coupling portion 11a having an arc shape when viewed from the axial direction and a tooth 11b extending radially inward from a circumferentially central part of the coupling portion 11a. Describing the structure of the core segment 11, a plurality of core sheets 12, each formed by pressing and punching a magnetic steel plate into a predetermined shape are stacked so that a thickness direction of the core sheets 12 conforms to a central axis L1 of the coupling portions 11a. The twelve core segments 11 are coupled with one another by joining circumferential ends of coupling portions 11a of adjacent the core segments 11. An insulator 13 covers the axial ends and inner surface of each core segment 11. The insulator 13 is made of an insulative synthetic resin.

A coated conductor wire 14 is around the tooth 11b of each of the twelve core segments 11 from above the insulator 13 to form a coil 3. The coil 3 is wound around the tooth 11b in a concentrated winding, and the stator 1 has the same number of coils 3 as the number of teeth 11b. The insulator 13 is arranged between the coil 3 and the core segment 11 to insulate the core segment 11 from the coil 3. As illustrated in FIG. 2B, the coated conductor wire 14 is formed by coating an electrically conductive metal wire 14a with an insulating coating 14b. The coated conductor wire 14 has a diameter of 0.3 mm.

As illustrated in FIG. 2A, lead lines 15 forming winding-initiating and winding-terminating ends of the coils 3 are drawn in a drawing direction toward outside from one axial side (upper side in FIG. 2A) of the stator core 2. In this embodiment, the drawing direction of the lead lines 15 conforms to the axial direction of the stator core 2. Two lead lines 15 are drawn out from each coil 3. Thus, the number of the lead lines 15 in the stator 1 is twice the number of the coils 3. The winding-initiating lead lines 15 and the winding-terminating lead lines 15 of each coil 3 are drawn out in the axial direction from both circumferential sides of the corresponding tooth 11b in the vicinity of the basal portion of the tooth 11b. As illustrated in FIG. 2B, the insulating coating 14b is not applied to a distal portion of each lead line 15 to expose the metal wire 14a. The metal wire 14a is chamfered at the distal portion of the lead line 15 so that the distal portion has a conical shape and an outer diameter that is reduced toward the distal end.

As illustrated in FIG. 2A, each insulator 13 has an end surface cover 13a that covers an axial end surface (upper end surface in FIG. 2A) of the coupling portion 11a of the corresponding core segment 11. The end surface cover 13a projects in an axial direction from the axial end surface of the coupling portion 11a to prevent the corresponding coil 3 from extending outward in the radial direction.

Figure 3:
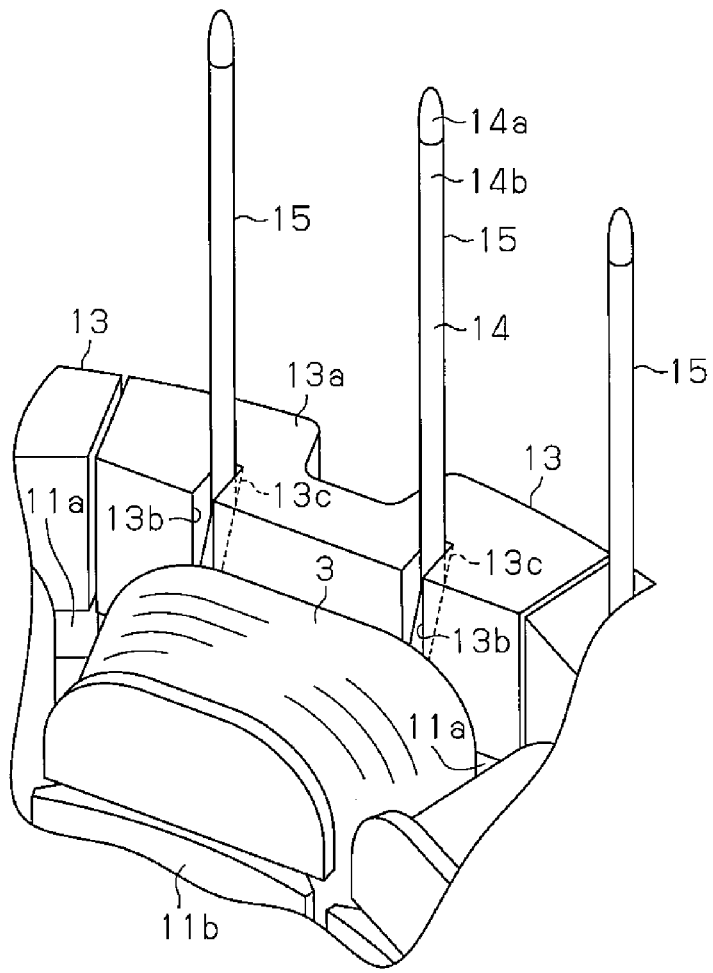
FIG. 3 is a partially enlarged perspective view of a stator core illustrated in FIG. 2A around which coils are wound.

As illustrated in FIG. 3, the end surface cover 13a of each insulator 13 has two groove-shaped end holding portions 13b extending along the axial direction. The two end holding portions 13b are formed in each insulator 13 on both circumferential sides of the corresponding tooth 11b in the vicinity of the basal portion of the tooth 11b. The end holding portions 13b are open inward in the radial direction and toward one axial side in the direction opposite to the core segments 11. The end holding portion 13b has a circumferential width substantially equal to the diameter of the coated conductor wire 14. The radially outer side of each end holding portion 13b forms a bottom surface 13c tilted relative to the axial direction so that the bottom surface 13c becomes closer to a circumferential surface of the end surface cover 13a, that is, the distance from the edge of the tooth 11b is increased, from the axial side of the bottom surface 13c that is closer to the coupling portion 11a toward the other axial side of the bottom surface 13c that is closer to the edge of the end surface cover 13a. As illustrated in FIG. 2A, a total of twenty-four end holding portions 13b are formed in the twelve insulators 13 and arranged in the circumferential direction at equal angular intervals (at intervals of 15°) on one axial side of the stator core 2 (side where the lead lines 15 are drawn out).

As illustrated in FIGS. 2A and 3, basal portions (root parts) of the winding-initiating lead lines 15 and the winding-terminating lead lines 15 of the respective coils 3 are fitted (pressed) into the proximal end holding portions 13b and held in the end holding portions 13b. The basal portions of the lead lines 15 fitted in the end holding portions 13b are thus immovable relative to the stator core 2 at one axial side of the stator core 2 (upper side in FIG. 2A). Accordingly, the basal portions of the lead lines 15 are fixed relative to the stator core 2. The total of twenty-four lead lines 15 are held by the twenty-four end holding portions 13b and arranged in the circumferential direction at equal angular intervals (intervals of 15°). The basal portions of the lead lines 15 are fitted in the end holding portions 13b in contact with the bottom surfaces 13c of the end holding portions 13b. The basal portions are tilted relative to the axial direction along the bottom surfaces 13c.

As illustrated in FIGS. 1 and 2A, the substrate 4 includes a substrate body 4a having a disc-like shape and an external connector 4b having a rectangular plate shape and extending radially outward from the substrate body 4a. A printed wiring (not illustrated in the drawings) and a plurality of circuit elements (not illustrated in the drawings) are formed on the substrate 4. The substrate body 4a includes a total of twenty-four connecting portions 4c, the number of which is the same as the lead lines 15 of the stator 1. The connecting portions 4c are holes extending through the substrate 4 in a thickness direction of the substrate 4 and circular when viewed from the axial direction. The diameter of the connecting portions 4c is slightly larger than the diameter of the metal wires 14a forming the coated conductor wires 14. The cross-section of each connecting portion 4c taken along a direction orthogonal to the axial direction of the stator core 2 in the thickness direction of the substrate 4 has a uniform shape. The connecting portions 4c are electrically connected to the printed wiring formed on the surface of the substrate 4, and predetermined ones of the connecting portions 4c are connected to each other through the printed wiring. The twenty-four connecting portions 4c are formed in the circumferential direction at equal angular intervals (at intervals of 15°) in the outer surface of the substrate body 4a. The connecting portions 4c are formed in the substrate body 4a so that the distance between each connecting portion 4c and a radially central position of the substrate body 4a is equal to the distance between the part of each lead line 15 located in the axial opening of the end holding portion 13b and the central axis L2 of the stator core 2.

The substrate 4 is located on one axial side of the stator core 2 where the lead lines 15 are drawn out. The substrate 4 is arranged at one axial side of the stator core 2 so that its thickness direction conforms to the axial direction of the stator core 2 and the radially central position of the substrate body 4a lies along the central axis L2 of the stator core 2. Further, the substrate 4 is in contact with edge surfaces of the end surface covers 13a of the twelve insulators 13. The radial and circumferential positions of the twenty-four connecting portions 4c formed in the substrate body 4a correspond to the radial and circumferential positions of the distal portions of the twenty-four lead lines 15. The twenty-four lead lines 15 are received in the twenty-four connecting portions 4c and extend through the connecting portions 4c in the axial direction. In a state in which the lead lines 15 are received in the connecting portions 4c and extend inward in the radial direction from the connecting portions 4c in contact with inner surfaces of the connecting portions 4c, the lead lines 15 are soldered and electrically connected to the connecting portions 4c. Accordingly, the twenty-four lead lines 15 are electrically connected to the printed wiring, and predetermined ones of the lead lines 15 are connected to each other through the printed wiring. Thus, the coils 3 are connected in a desirable manner through the printed wiring.

A manufacturing apparatus 21 for manufacturing the stator 1 will now be described.

Figure 5:
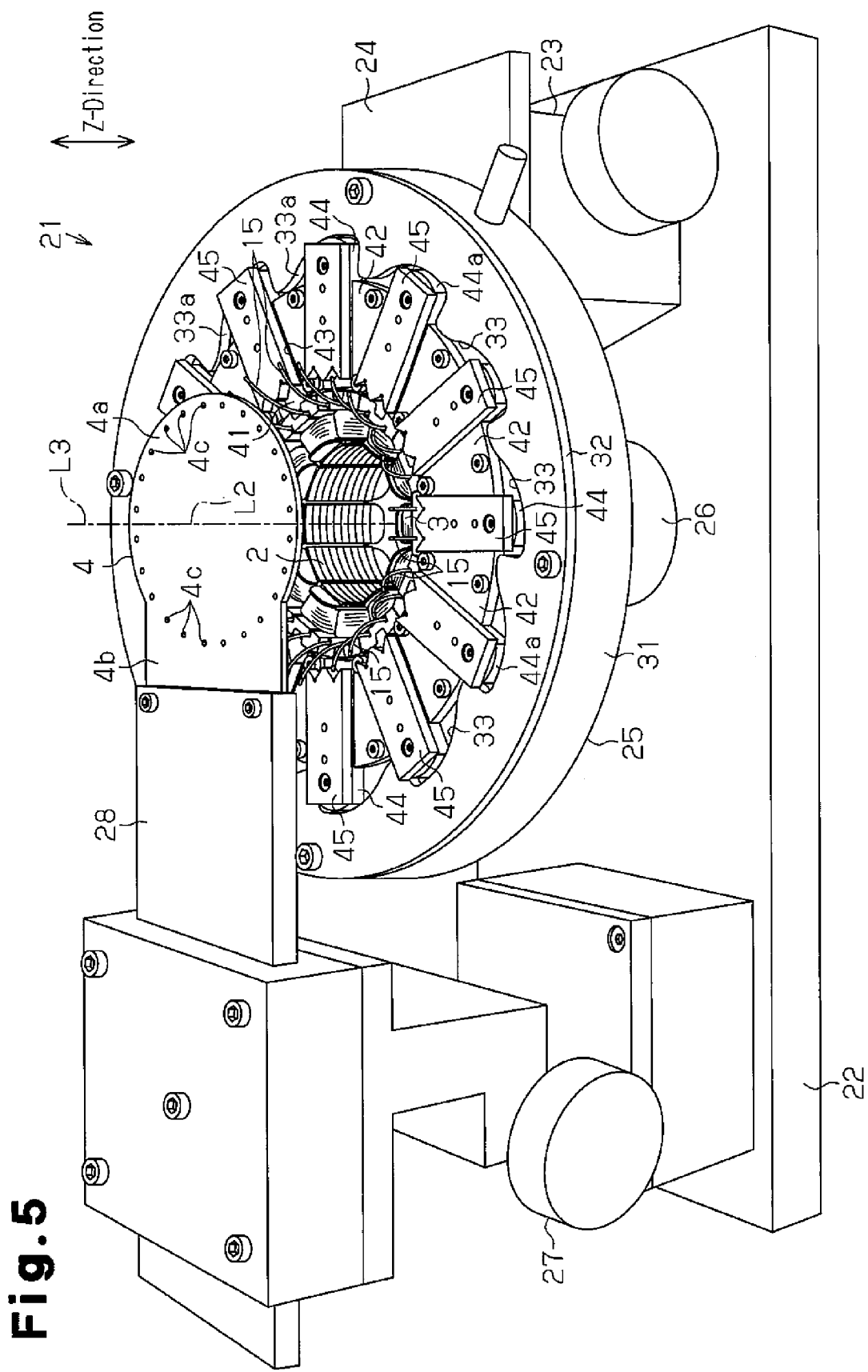
FIG. 5 is a schematic diagram of an apparatus for manufacturing the stator.

As illustrated in FIG. 5, the manufacturing apparatus 21 includes a base 22 having a rectangular plate-like shape. A first driving device 23 is arranged at the right side of the base 22 as viewed in FIG. 5. The first driving device 23 is driven by a driving force generated by, for example, a motor not illustrated in the drawing to move a support plate 24 coupled to an upper section of the first driving device 23 in a Z direction. The Z direction is a direction orthogonal to an upper surface of the base 22, which is the vertical direction as viewed in FIG. 5. The support plate 24 has a plate-like shape orthogonal to the Z direction.

A holding device 25 having an annular shape is arranged on the support plate 24. The holding device 25 is set on the support plate 24 so that its central axis L3 is parallel to the Z direction. The holding device 25 includes an annular first holding body 31. An annular cam plate 32 is fixed to an upper surface of the first holding body 31, more specifically, to an end surface of the first holding body 31 at the opposite side of the base 22 in the axial direction. The cam plate 32 has inner and outer diameters substantially equal to inner and outer diameters of the first holding body 31.

The cam plate 32 has a total of twelve cam recesses 33, the number of which is equal to the number of the coils 3 in the stator 1. The twelve cam recesses 33 are identical in shape and extend from the radially inner side toward the radially outer side of the cam plate 32. The twelve cam recesses 33 are formed in the circumferential direction at equal angular intervals (intervals of 30°). When viewed from above in the Z direction, each cam recess 33 is shaped to have a depth (radial depth) that increases from a rear end in the clockwise direction to the front end in the clockwise direction along the circumferential direction.

Figure 6A:
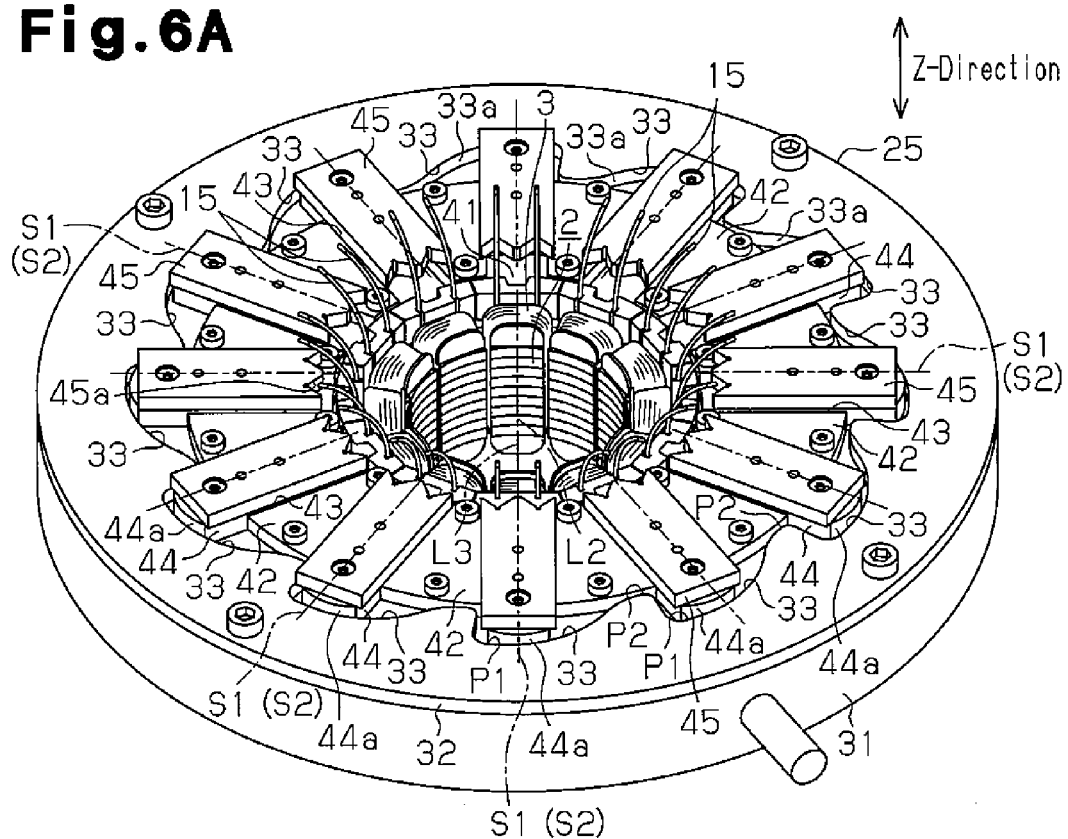
FIGS. 6A and 6B are perspective views of a holding device.

Referring to FIG. 6A, a cam surface 33a, which is an inner surface of each cam recess 33, is parallel to the Z direction (in the same direction as the central axis L3 of the holding device 25) and curved so that a radial position of the cam surface 33a changes at different circumferential positions. When viewed from above along the Z direction, the cam surface 33a of each cam recess 33 is curved so that from the radial position of the cam surface 33a shifts inward in the radial direction from the front end of the cam surface 33a in the clockwise direction toward the rear end of the cam surface 33a in the clockwise direction. The rear end of the cam surface 33a in the clockwise direction is smoothly connected to the cam surface 33a of the next cam recess 33 in the clockwise direction. In each cam surface 33a, the radially outermost part at the front end in the clockwise direction is referred to as a non-engagement position P1, and a radially innermost part of the rear end in the clockwise direction is referred to as an engagement position P2.

An annular second holding body 41 concentric to the first holding body 31 is arranged at an inner side of the first holding body 31. The second holding body 41 has an outer diameter substantially equal to an inner diameter of the first holding body 31, and the second holding body 41 has an inner diameter slightly larger than an outer diameter of the stator core 2. The second holding body 41 has an axial thickness that is substantially equal to an axial thickness of the first holding body 31.

Twelve guiding members 42 are fixed to an upper surface of the second holding body 41, more specifically, to an axial end surface of the second holding body 41 at the opposite side of the base 22. The twelve guiding members 42 are fixed to the upper surface of the second holding body 41 and arranged in the circumferential direction at equal angular intervals (at intervals of 30°). The guiding member 42 has a triangular plate shape with a circumferential width that increases from a radially inner end to a radially outer end. The guiding member 42 has a larger thickness (thickness in the Z direction) than the thickness of the cam plate 32. The guiding member 42 has a radial width equal to a radial width of the second holding body 41. The twelve guiding members 42 each form a radially extending guiding groove 43 with the adjacent guiding member 42 in the circumferential direction. The two end surfaces of each guiding member 42 in the circumferential direction are parallel to the Z direction and extend parallel to a central line S1 of the guiding groove 43. The central line S1 extends through a circumferentially central position of the guiding groove 43 in the radial direction. Therefore, the guiding groove 43 has a width that is fixed along the central line S1.

Box-shaped guided members 44 are arranged on the upper surface of the second holding body 41 between adjacent guiding members 42 in the circumferential direction, that is, in each guiding groove 43. The guided member 44 has a larger thickness in the Z direction than the guiding member (thickness in the Z direction). The guided member 44 has a circumferential width substantially equal to a circumferential width of the guiding groove 43. An end surface of the guided member 44 on the radially outer side serves as a sliding surface 44a that comes into contact with and slides along the cam surface 33a. The sliding surface 44a is parallel to the Z direction, arc-shaped, and bulges outward in the radial direction. The radial length of the guided member 44 is determined so that an end of the guided member 44 on the radially inner side does not protrude further radially inward from an inner surface of the second holding body 41 and does not protrude further radially outward from an end surface of the guiding member 42 at the radially outer side when the sliding surface 44a is in contact with the non-engagement position P1 of the cam surface 33a. The guided members 44 are urged radially outward by urging members not illustrated in the drawings so as to be constantly in contact with the cam surface 33a of any one of the twelve cam recesses 33.

A positioning jig 45 is securely fixed to an upper surface of each guided member 44, more specifically, to an end surface of each guided member 44 at the opposite side of the second holding body 41 so as to be integrally movable with the guided member 44. The positioning jig 45 has a plate-like shape elongated in a radial direction of the second holding body 41. The positioning jig 45 has a thickness less than or equal to 1 mm. The positioning jig 45 has a circumferential width slightly larger than a circumferential width of the guided member 44 (width in the circumferential direction of the guiding groove 43). A central line S2 extends through a circumferentially central position of the positioning jig 45 (width direction of the positioning jig 45) in the radial direction (longitudinal direction) of the positioning jig 45 and the radial direction of the holding device 25. When the holding device 25 is viewed from the Z direction, the central lines S2 of the twelve positioning jigs 45 conform with the central lines S1 of the twelve guiding grooves 43. The positioning jig 45 has a radial length larger than a radial length of the second holding body 41. The twelve positioning jigs 45 are circumferentially arranged at equal angular intervals (intervals of 30°) at the same position relative to the Z direction.

Figure 4:
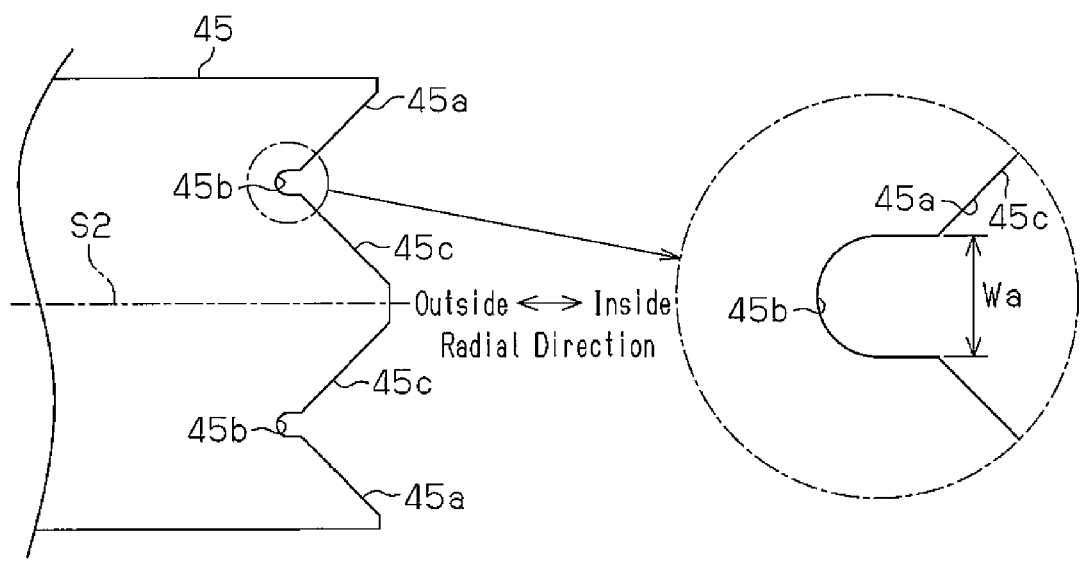
FIG. 4 is an enlarged view of a positioning jig.

As illustrated in FIG. 4, two restraining portions 45a are formed in the radially inner end of each positioning jig 45. The two restraining portions 45a are formed at two positions adjacent to each other in a width direction of the positioning jig 45 (circumferential direction of the holding device 25) at the radially inner end of the positioning jig 45. The two restraining portions 45a are recessed and open inward in the radial direction from the radially inner side toward the radially outer side of the positioning jig 45. The restraining portions 45a extend through the positioning jig 45 in the axial direction (thickness direction). A holding groove 45b, which opens toward the radially inner side of the holding device 25, is formed in a bottom part of each restraining portion 45a. The holding groove 45b extends through the positioning jig 45 in the axial direction (thickness direction) and has a U-shaped when viewed from the axial direction (thickness direction of the positioning jig 45). A bottom part of the holding groove 45b has a semicircular inner surface extending along a cylindrical outer surface of the lead line 15 (see FIG. 6A). A width (circumferential width) Wa of the holding groove 45b is set to a dimension that restricts circumferential movement of the lead line 15 received in the holding groove 45b. The width Wa of the holding groove 45b is 0.5 mm, which is slightly larger than the diameter of the coated conductor wire 14. The semicircular bottom part of the holding groove 45b has a curvature radius having a value slightly larger than the radius of the lead line 15 (coated conductor wire 14) and half the width of the holding groove 45b. In the positioning jig 45, an interval between the two holding grooves 45b is equal to an interval between circumferentially adjacent lead lines 15 (between basal portions of the lead lines 15) as illustrated in FIG. 6A.

As illustrated in FIG. 4, each restraining portion 45a has an opening directed toward the radially inner side and a guide 45c formed in the opening and increases in width in the circumferential direction toward the radially inner side. The guide 45c is continuously formed from the holding groove 45b and extends from the opening of the holding groove 45b to the opening of the restraining portion 45a. The circumferential width of the guide 45c is equal to the width Wa of the holding groove 45b in a radially outer end of the guide 45c adjacent to the holding groove 45b, and the circumferential width increases toward the radially inner side. The guide 45c is formed so that the angle between its two circumferential inner surfaces is less than or equal to 90°. The restraining portion 45a having the holding groove 45b and the guide 45c is line symmetric relative to a straight line extending through a central position of the restraining portion 45a in the width direction and extending in the longitudinal direction of the positioning jig 45 (not illustrated in the drawings) as viewed from the axial direction (thickness direction of the positioning jig 45).

As illustrated in FIGS. 5 and 6A, the first holding body 31 of the holding device 25 is rotatable around the central axis L3 of the holding device 25 serving as a rotational center relative to the second holding body 41 when driven by a driving device not illustrated in the drawings. The second holding body 41 is fixed so as not to be rotatable around the central axis L3 as a rotational center relative to the support plate 24. The first holding body 31 is rotatable around the central axis L3 of the holding device 25 relative to the support plate 24.

When the first holding body 31 is rotated relative to the second holding body 41, the cam plate 32 is rotated relative to the guided members 44. Therefore, the guided members 44, which are guided by the guiding members 42, are radially moved in accordance with the positions of contacts between the sliding surfaces 44a and the cam surfaces 33a. More specifically, the positioning jigs 45 fixed to the guided members 44 are radially moved in a sliding manner by a cam mechanism including the cam surfaces 33a and the guided members 44 when the first holding body 31 is rotated relative to the second holding body 41.

Figure 6B:
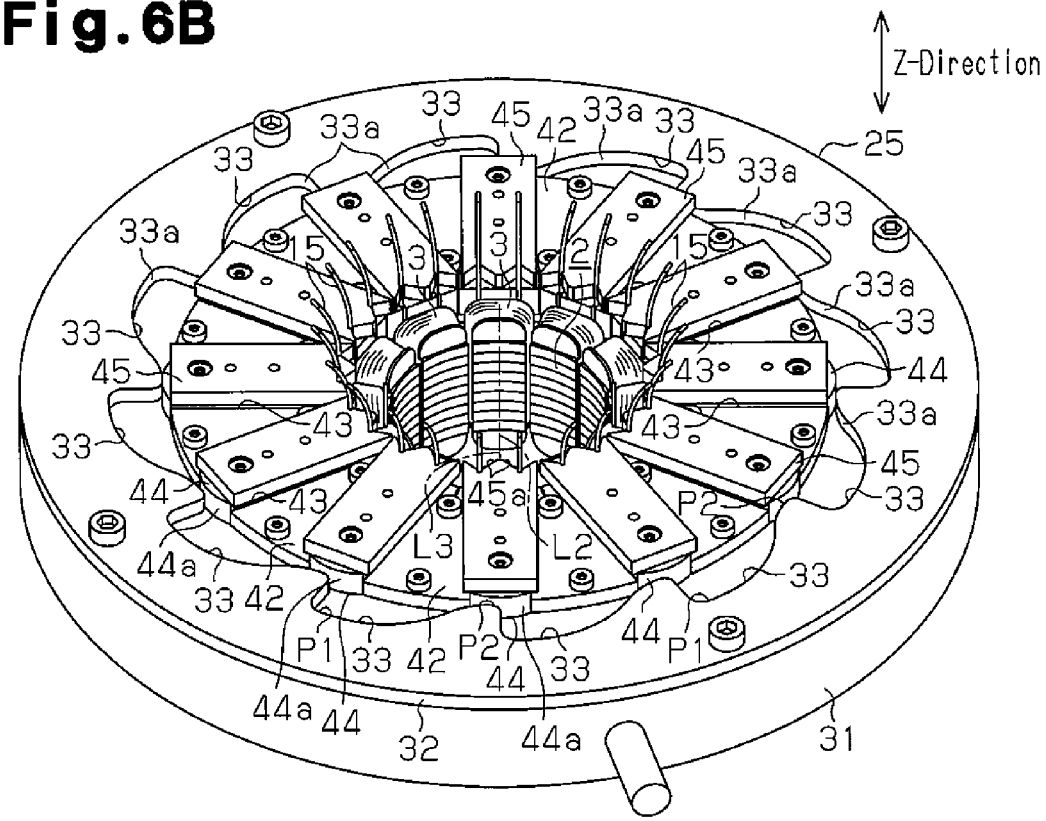

Then, as illustrated in FIGS. 6B and 4, the twelve positioning jigs 45 are moved toward and located on the radially innermost side while the sliding surfaces 44a of the twelve guided members 44 are respectively in contact with the engagement positions P2 of the cam surfaces 33a. In this state, the ends of the positioning jigs 45 at the radially inner side protrude further radially inward than the inner edge of the second holding body 41. The positions at which the positioning jigs 45 are located when the sliding surfaces 44a of the guided members 44 are respectively in contact with the engagement positions P2 of the cam surfaces 33a are referred to as holding positions. When the positioning jigs 45 are located at the holding positions, the total of twenty-four holding grooves 45b in the twelve positioning jigs 45 are circumferentially arranged at equal angular intervals (intervals of 15° in the circumferential direction). Further, the distance between a center of curvature of an arc-shape part in the bottom part of each holding groove 45b and a radially central position of the holding device 25 (central axis L3 of the holding device 25) is equal to the distance between the part of the lead line 15 located in the axial opening of the end holding portion 13b and the central axis L2 of the stator core 2. Moreover, the distance between the center of curvature of the arc-shape part in the bottom part of each holding groove 45b and the radially central position of the holding device 25 becomes substantially equal to a distance between a central position of each connecting portion 4c formed in the substrate 4 and the radially central position of the substrate body 4a.

Further, as illustrated in FIGS. 6A and 4, the twelve positioning jigs 45 are moved toward and located on the radially outermost side when the sliding surfaces 44a of the twelve guided members 44 are respectively in contact with the non-engagement positions P1 of the cam surfaces 33a. In this state, the ends of the positioning jigs 45 on the radially inner side are located further radially outward than the inner peripheral edge of the second holding body 41. The positions at which the positioning jigs 45 are located when the sliding surfaces 44a of the guided members 44 are respectively in contact with the non-engagement positions P1 of the cam surfaces 33a are referred to as retraction positions.

As illustrated in FIG. 5, a cylindrical support bar 26 is arranged in a substantially central part of the upper surface of the base 22. The support bar 26 is coaxial to the holding device 25 below the holding device 25. The support bar 26 has an outer diameter that is smaller than the inner diameter of the second holding body 41 and larger than an inner diameter of the stator core 2. The support bar 26 supports the stator core 2 in the holding device 25 from below.

A second driving device 27 is arranged on the base 22 at the opposite side of the first driving device 23 (left-end in the illustration of FIG. 5) with the holding device 25 and the support bar 26 arranged in between. A substrate holding tool 28 having the shape of a flat plate and protruding above the holding device 25 is fixed to an upper section of the second driving device 27. The substrate holding tool 28 holds the external connector 4b of the substrate 4 at its distal portion. The second driving device 27 moves the substrate 4 in the Z direction by moving the substrate holding tool 28 in the Z direction with driving force generated by, for example, a motor.

A method for manufacturing the stator 1 with the manufacturing apparatus 21 will now be described.

Figure 7:
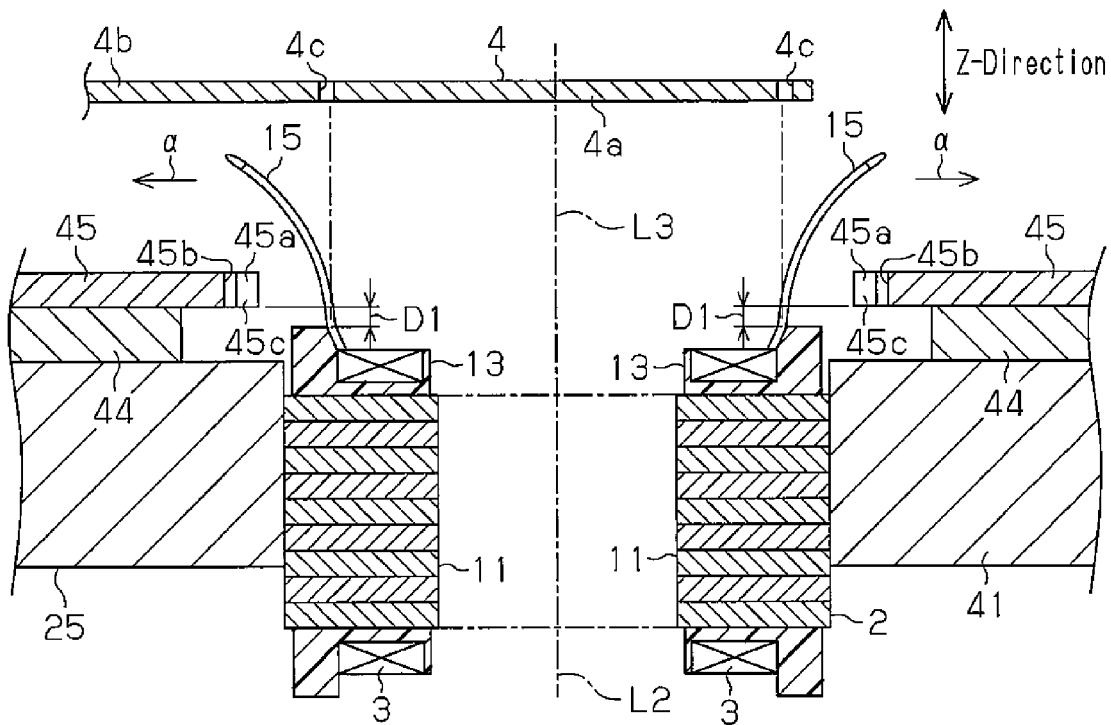
FIGS. 7 to 9 are schematic diagrams illustrating a method for manufacturing the stator.

First, a stator core positioning step is performed to position the stator core 2, on which the coils 3 are wound, in the holding device 25 as illustrated in FIGS. 6A and 7. The lead lines 15 of the coils 3 wound around the stator core 2 are drawn out from one axial side of the stator core 2. The drawing direction of the lead lines 15 conforms to the axial direction of the stator core 2. The basal portions (root parts) of the lead lines 15 are fitted into and received by the end holding portions 13b of the insulators 13. The basal portions of the lead lines 15, which are fitted in the end holding portions 13b, are immovable relative to the stator core 2 at one axial side of the stator core 2. The twenty-four lead lines 15 are formed (shaped) so that the lengths from the parts received in the end holding portions 13b to the distal portions are equal. The basal portions of the lead lines 15 fitted in the end holding portions 13b are in contact with the bottom surfaces 13c of the end holding portions 13b and tilted relative to the axial direction along the bottom surfaces 13c. As a result, the lead lines 15c are tilted relative to the distal portions at the radially outer side of the basal portions. In the manufacturing apparatus 21, the holding device 25 is moved downward (toward the base 22) by the first driving device 23, and the twelve positioning jigs 45 are moved to the retraction positions. The stator core 2 is inserted into the holding device 25 so that the axial end at which the lead lines 15 are drawn out is located at an upper side and an axial end at the side opposite to the side where the lead lines 15 are drawn out is located at a lower side (on the side of the base 22). The stator core 2 in the holding device 25 is supported by the support bar 26 from below. The stator core 2 is concentric to the holding device 25 with the central axis L2 of the stator core 2 aligned with the central axis L3 of the holding device 25. Further, the stator core 2 is set in the holding device 25 so that the circumferential positions of the twelve teeth 11b correspond to the circumferential positions of the twelve positioning jigs 45. The axial direction of the stator core 2 conforms to the Z direction, and the stator core 2 is arranged at a position lower than the positioning jigs 45 in the Z direction (axial direction). More specifically, the stator core 2 is arranged at a position at which a distance D1 in the Z direction between the positioning jig 45 and a part of each lead line 15 on the basal portion located in the axial opening of the end holding portion 13b is less than or equal to 10 mm. A part of each lead line 15 radially facing the restraining portion 45a is a part of the lead line 15 near the basal portion. This is also a part of the lead line 15 closer to the basal side than a longitudinally central part of the lead line 15. In a state in which the stator core 2 is set in the holding device 25, the twenty-four lead lines 15 extending radially outward as viewed from the Z direction.

Next, a substrate positioning step for positioning the substrate 4 relative to the stator core 2 is performed as illustrated in FIGS. 5 and 7. In the substrate positioning step, the external connector 4b of the substrate 4 is securely fixed to the distal portion of the substrate holding tool 28 so that the substrate 4 is held by the substrate holding tool 28. In this state, the substrate holding tool 28 is moved by the second driving device 27 to a height position that prevents the substrate 4 from being in contact with the lead lines 15. When the substrate 4 is held by the substrate holding tool 28, the thickness direction of the substrate conforms to the Z direction, and the substrate body 4a is located coaxial to the stator core 2 axially facing the end of the stator core 2 in the axial direction at the side where the lead lines 15 are drawn out. The substrate 4 is spaced apart from the stator core 2 in the axial direction by a distance that is greater than the lengths of the lead lines 15.

The circumferential positions of the twenty-four connecting portions 4c formed in the substrate body 4a conform to the circumferential positions of the basal portions of the twenty-four lead lines 15. The twenty-four connecting portions 4c face the basal portions of the twenty-four lead lines 15 in the Z direction (axial direction of the stator core 2). When the substrate 4 is positioned relative to the stator core 2, the lead lines 15 are positioned relative to the substrate 4 with the edges of the lead lines 15 separated radially outward from the connecting portions 4c to which the lead lines 15 are connected. A separation direction α in which the edge of each lead line 15 is separated from the connecting portion 4c is a direction extending outward in the radial direction. The lead lines 15 are extended in the Z direction (axial direction of the stator core 2) so that the distal portions of the lead lines 15 are separated outward in the radial direction from the connecting portions 4c above the lead lines 15. The substrate positioning step positions the substrate 4 relative to the lead lines 15.

Figure 8:
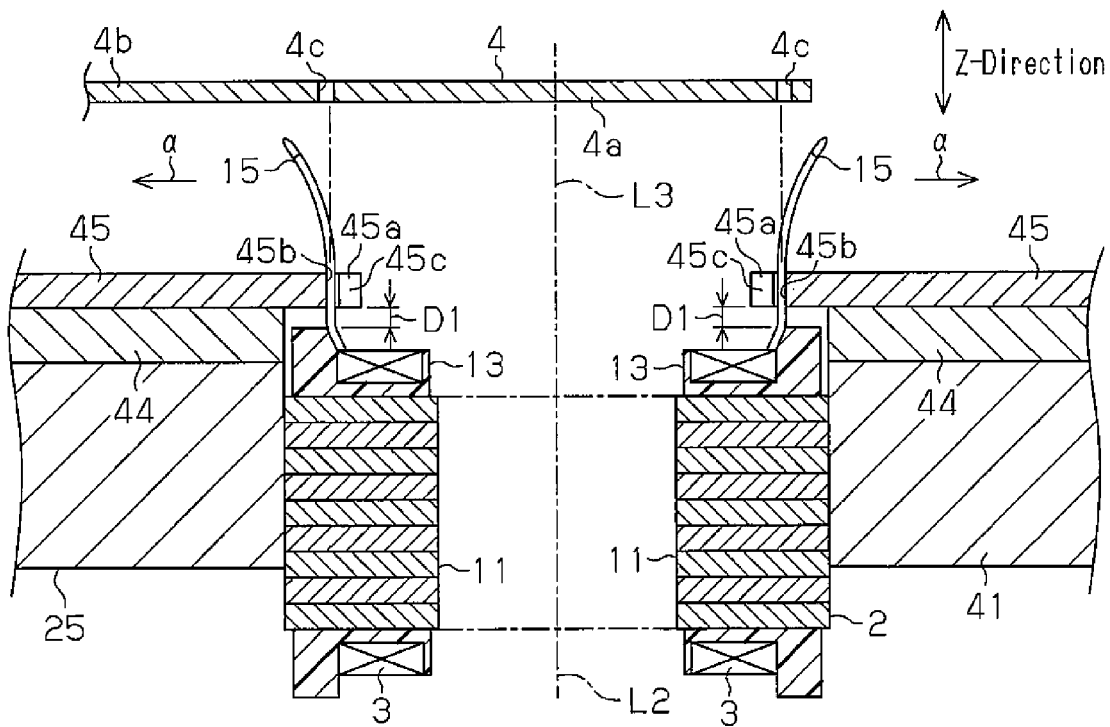

Then, a lead line holding step for holding the lead lines 15 using the positioning jigs 45 is performed as illustrated in FIGS. 6B and 8. When the first holding body 31 is rotated relative to the second holding body 41 around the central axis L3 of the holding device 25 serving as a rotational center (rotated clockwise in the illustration of FIG. 6B), the twelve positioning jigs 45 are moved radially inward and located at the holding positions. In other words, each positioning jig 45 is moved in a radially inward direction, which is a direction opposite to the separation direction α along the radial direction. This inserts parts of the lead lines 15, which are proximal to the basal portions that are located more inward in the radial direction from the restraining portions 45a that are open at the radially inner side, into the restraining portions 45a. More specifically, the parts of the lead lines 15 near the basal portions are inserted into the restraining portions 45a by the guides 45c as the positioning jigs 45 move radially inward. Then, the parts of the lead lines 15 extending through the guides 45c are inserted in the holding grooves 45b until they reach the bottom parts.

The restraining portions 45a are recessed and open in the direction opposite to the separation direction α. The restraining portions 45a allow movement of the received lead lines 15 in the drawing direction (axial direction of the stator core 2), while restricting movement of the lead lines 15 in a direction that differs from the drawing direction and is orthogonal to he separation direction α. The direction that differs from the drawing direction of the lead lines 15 and is orthogonal to the separation direction α is the circumferential direction (direction orthogonal to the separation direction α and orthogonal to the axial direction of the stator core 2). The restraining portions 45a allow movement of the received lead lines 15 in the axial direction of the stator core 2, while restricting movement of the lead lines 15 in the circumferential direction. The guide 45c formed in the opening of the restraining portion 45a at the radially inner side has a larger width than the holding groove 45b in the direction that differs from the drawing direction of the lead lines 15 (axial direction of the stator core 2) and is orthogonal to the separation direction α (circumferential direction). Thus, even if the parts of the lead lines 15 proximal to the basal portions and radially facing the positioning jigs 45 are separated from to the holding grooves 45b in the direction that differs from the drawing direction of the lead lines 15 and is orthogonal to the separation direction α (circumferential direction) when the lead lines 15 are inserted in the restraining portions 45a as the positioning jigs 45 are moved radially inward, the parts of the lead lines 15 proximal to the basal portions can easily be inserted into the restraining portions 45a. Moreover, the guide 45c is formed so that its width in the direction that differs from the drawing direction of the lead lines 15 (axial direction of the stator core 2) and is orthogonal to the separation direction α (circumferential direction) is smaller toward the opening of the holding groove 45b. The parts of the lead lines 15 proximal to the basal portions moved into the restraining portions 45a by the guides 45c during the radially inward movement of the positioning jigs 45 can easily move into the holding grooves 45b under the guidance by the guides 45c. The holding grooves 45b are formed continuously with the guides 45c and open in the direction opposite to the separation direction α. The bottom part of each holding groove 45b is formed in a semicircular shape having a radius that can follow the outer surface of the lead line 15. The width Wa of the holding groove 45b is set to have a dimension that restricts movement of the lead line 15 in the direction that differs from the drawing direction of the lead lines 15 and is orthogonal to the separation direction α. Therefore, the holding grooves 45b restrict movement of the lead lines 15 received in the holding grooves 45b in the direction that differs from the drawing direction of the lead lines 15 (axial direction of the stator core 2) and is orthogonal to the separation direction α (circumferential direction).

When the positioning jigs 45 are located at the holding positions, the lead lines 15 are inserted in the holding grooves 45b until they reach the bottom parts and come into contact with the bottom parts of the holding grooves 45b. When the positioning jigs 45 are located at the holding positions, the arc-shape parts of the holding grooves 45b are substantially coaxial to the connecting portions 4c above the holding grooves 45b. Then, the arc-shape parts of the holding grooves 45b are located at positions lower than the connecting portions 4c along the axial direction. Therefore, each positioning jig 45 located at the holding position holds the parts of the two lead lines 15 above the basal portions separated by the distance D1 from the bottom parts of the holding grooves 45b. As a result, the parts of the lead lines 15 near the basal portions are aligned with the connecting portions 4c radially and circumferentially. Each lead line 15 is tilted in a direction opposite to the opening of the holding groove 45b formed in the radial direction (separation direction α which is a radially outward direction) and thus easily comes into contact with the bottom part of the holding groove 45b. In the radial direction, the lead lines 15 can be held by the holding grooves 45b just by simply restricting the lead lines 15 from the outer side in the radial direction with the holding grooves 45b.

Figure 9:
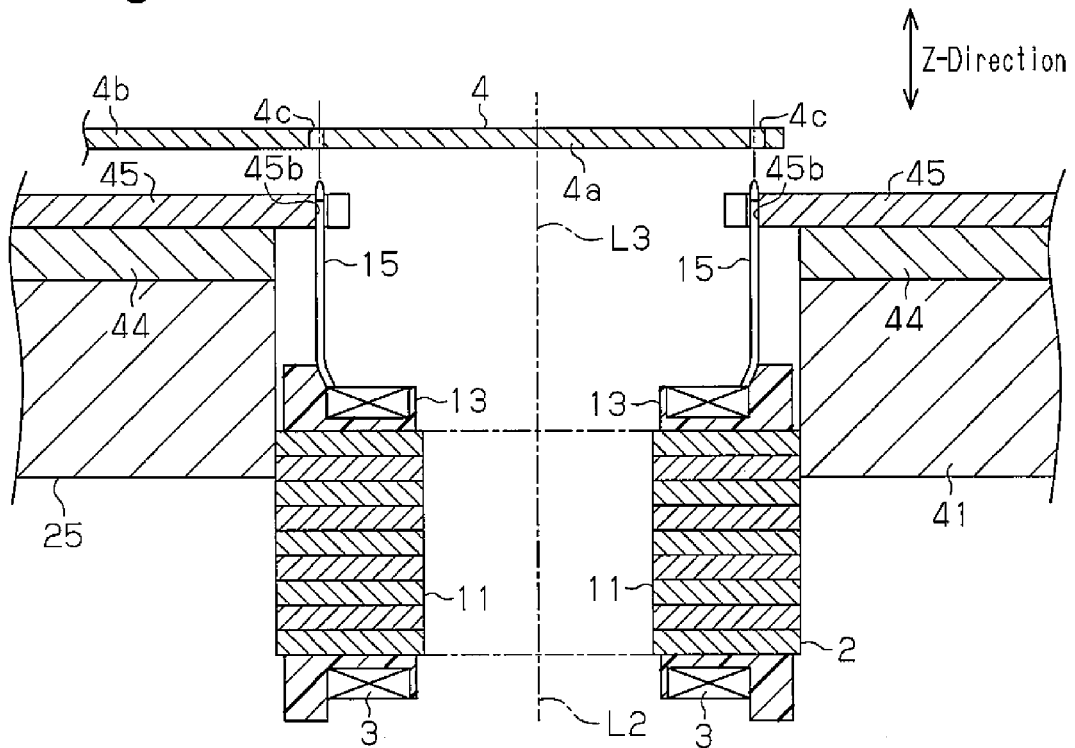
Figure 10:
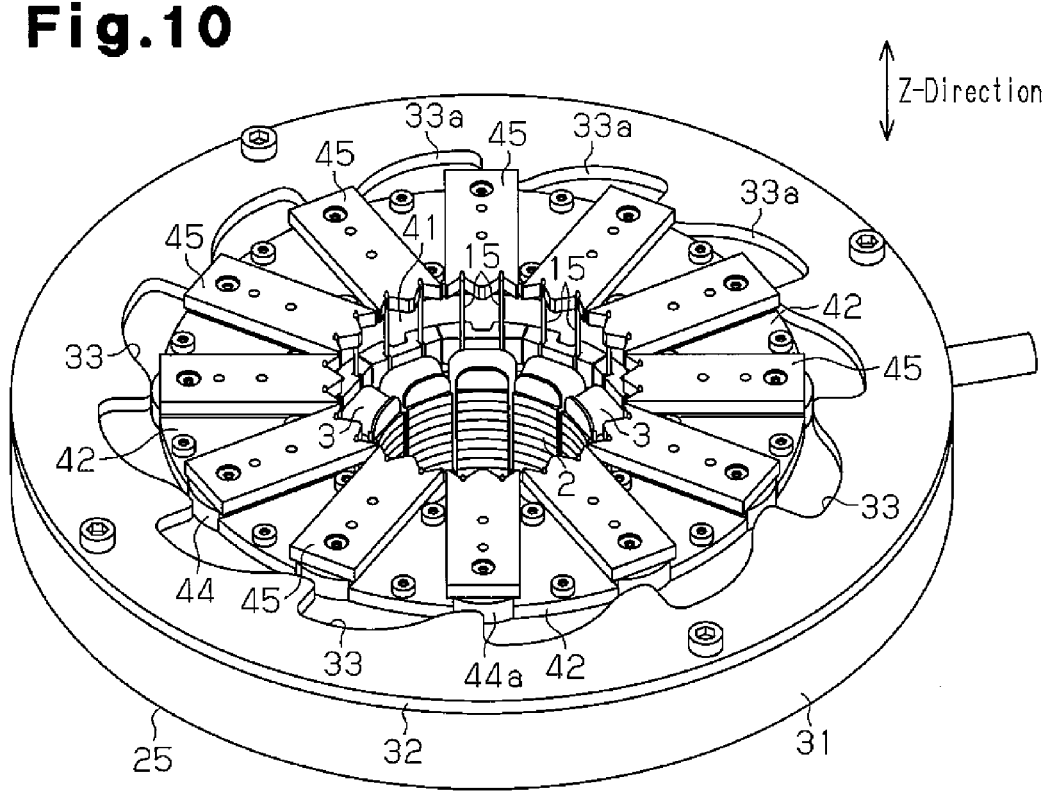
FIG. 10 is a perspective view of the holding device.

Next, a positioning jig lifting step for lifting the positioning jigs 45 is performed as illustrated in FIGS. 9 and 10. In the positioning jig lifting step, the holding device 25 is lifted by the first driving device 23 so that the twelve positioning jigs 45 are moved toward the substrate 4 along the axial direction. In this state, the positioning jigs 45 are moved upward with the lead lines 15 held in the bottom parts of the holding grooves 45b. The restraining portions 45a allow the lead lines 15 to move in the drawing direction. Thus, the positioning jigs 45 are easily axially moved while the lead lines 15 held in the restraining portions 45a are allowed to move in the axial direction. The lead lines 15 tilted in the direction opposite to the openings of the holding grooves 45b formed in the radial direction remain held in the bottom parts of the holding grooves 45b. Further, the lead lines 15 are extended along the Z direction with the edge-side parts moved radially inward (direction opposite to the separation direction α) as the holding grooves 45b are lifted. The edges of the lead lines 15 are moved radially inward by the positioning jigs 45. The holding device 25 is lifted to and stopped a position where the lengths of the lead lines 15 protruding from upper surfaces of the positioning jigs 45 toward the substrate 4 are from 1.0 mm to 1.5 mm. The arc-shape parts in the bottom parts of the holding grooves 45b are substantially coaxial to the connecting portions 4c above the holding grooves 45b. Therefore, centers of the edges of the lead lines 15 retained on the distal portions by the positioning jigs 45 are located in (ranges of) inner walls of the connecting portions 4c when viewed from the Z direction (axial direction of the stator core 2). The edges of the twenty-four lead lines 15 are aligned with the twenty-four connecting portions 4c radially and circumferentially. The positioning jig lifting step and the lead line holding step form a position alignment step.

Figure 11:
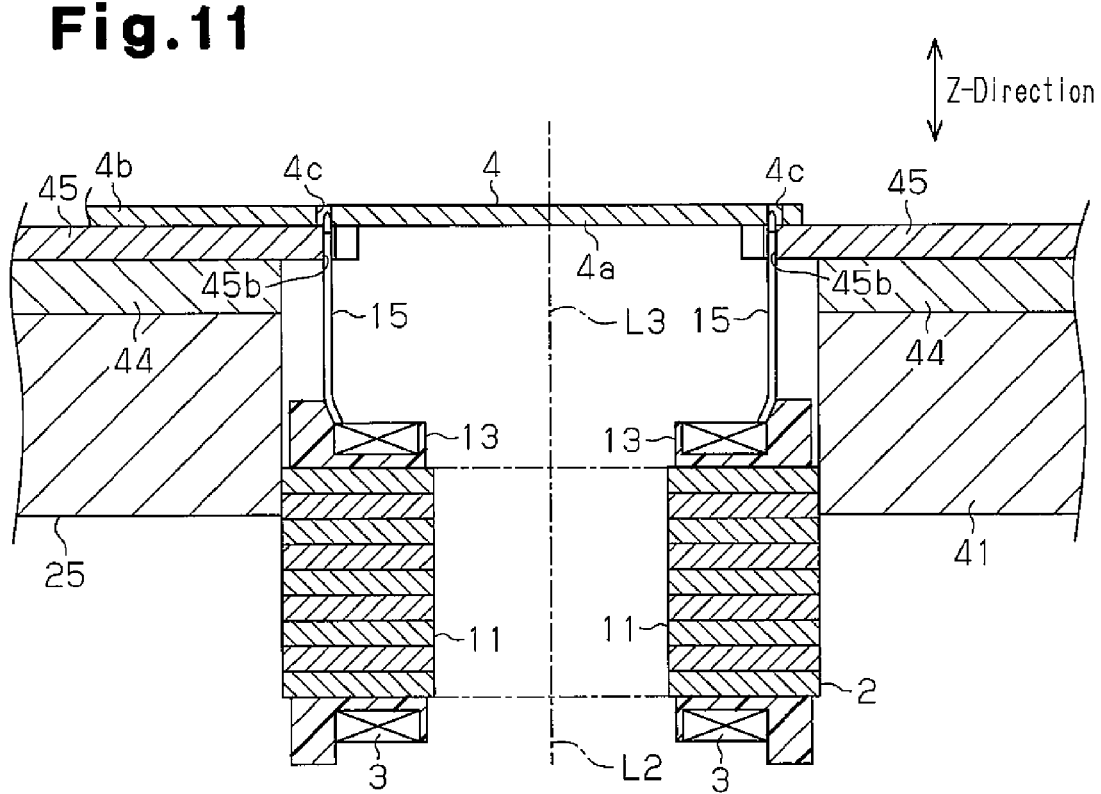
FIGS. 11 and 12 are schematic diagrams illustrating a method for manufacturing the stator.

Then, an edge inserting step for inserting the lead lines 15 into the connecting portions 4c is performed as illustrated in FIGS. 5 and 11. In the edge inserting step, the substrate holding tool 28 is moved downward by the second driving device 27 to move the substrate 4 toward the stator core 2 along the axial direction of the stator core 2 until the edges of the lead lines 15 are inserted in the connecting portions 4c from the axial direction and located in the connecting portions 4c (within the thickness of the substrate body 4a). The substrate holding tool 28 is moved downward to a position at which the distance between a lower surface of the substrate 4 and the upper surfaces of the positioning jigs 45 is less than or equal to 0.5 mm and then stopped at the position. The distal portions of the lead lines 15, which are chamfered into a conical shape, are easily inserted in the connecting portions 4c from the axial direction.

Figure 12:
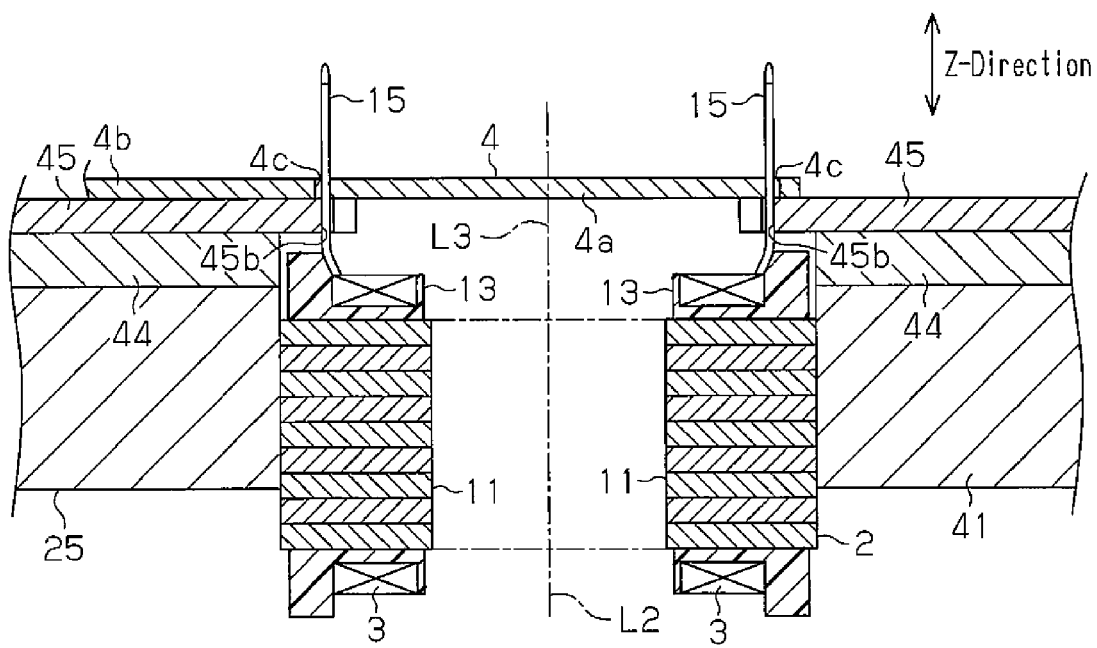
Figure 13:
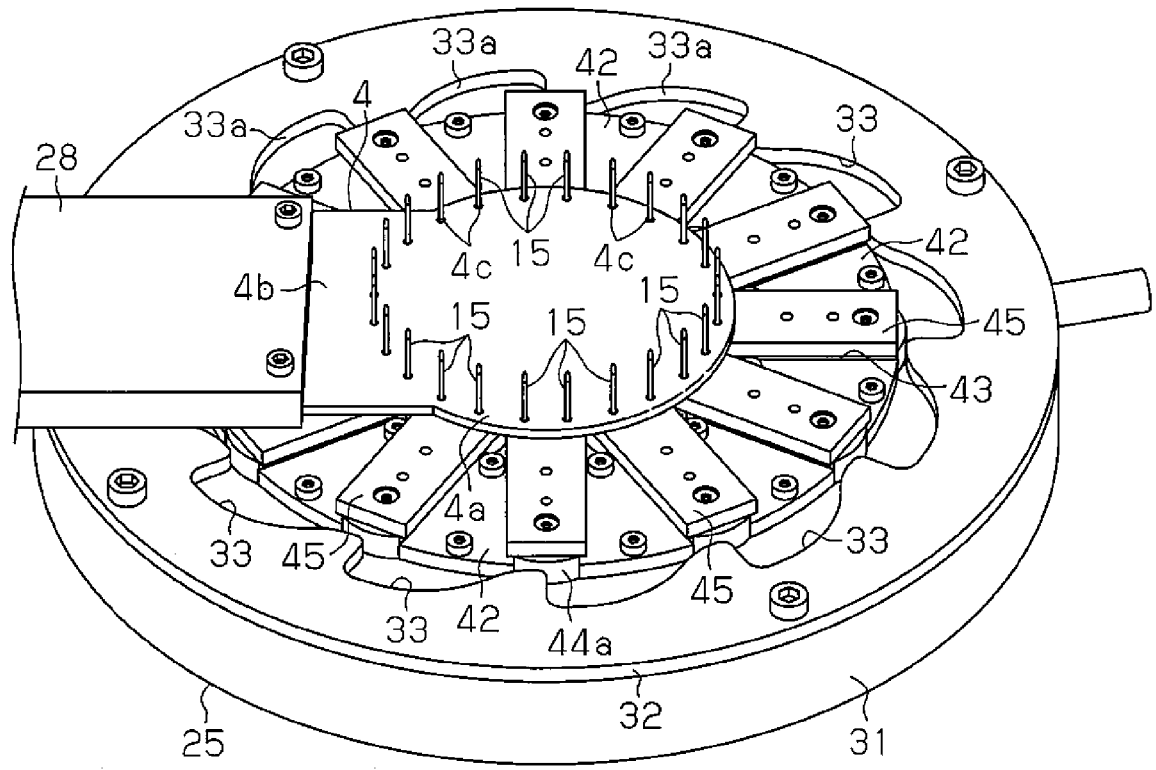
FIG. 13 is a perspective view of a substrate holding tool and the holding device.

Next, a positioning jig lowering step for lowering the positioning jigs 45 is performed as illustrated in FIGS. 5 and 12. In the positioning jig lowering step, the holding device 25 is moved downward by the first driving device 23. Simultaneously, the substrate holding tool 28 is moved downward by the second driving device 27. Accordingly, the positioning jigs 45 and the substrate 4 are moved downward with the distance between the substrate 4 and the positioning jigs 45 in the Z direction remaining unchanged. When the substrate 4 is moved downward, the twenty-four lead lines 15 are axially extended through the twenty-four connecting portions 4c. As a result, the twenty-four lead lines 15 are simultaneously coupled to the twenty-four connecting portions 4c as illustrated in FIG. 13. The holding device 25 is moved downward to and stopped at the same position as the position described in the stator core locating step where the positioning jigs 45 radially face the basal portions of the lead lines 15. The positioning jigs 45 moved downward are still holding the lead lines 15 in the bottom parts of the holding grooves 45b. The positioning jigs 45 extend the lead lines 15 from positions outward in the radial direction from the connecting portions 4c. Further, the lead lines 15 are pushed against the inner surfaces of the connecting portions 4c in contact with the connecting portions 4c. The positioning jig lowering step and the edge inserting step form an inserting step.

Next, a connecting step for electrically connecting the lead lines 15 to the connecting portions 4c is performed. In the connecting step, the connecting portions 4c are soldered so that the connecting portions 4c and the lead lines 15 in the connecting portions 4c are electrically connected. The lead lines 15 are pushed against the inner surfaces of the connecting portions 4c by the positioning jigs 45 from the radially outer side. Therefore, the lead lines 15 are not movable in the connecting portions 4c. The twenty-four lead lines 15 are electrically connected to the printed wiring, and predetermined ones of the lead lines 15 are electrically connected to each other through the printed wiring. Thus, the coils 3 are connected in a desirable manner through the printed wiring. This completes the manufacturing of the stator 1. Then, the stator 1 is removed from the manufacturing apparatus 21 after the positioning jigs 45 are arranged at the retraction positions and the substrate 4 is removed from the substrate holding tool 28.

The operation of the stator 1 will now be described.

The lead lines 15, which are in contact with the inner surfaces of the connecting portions 4c, are electrically connected to the connecting portions 4c. The lead lines 15 in contact with the inner surfaces of the connecting portions 4c are subtly movable relative the connecting portions 4c. This ensures that the lead lines 15 and the connecting portions 4c are stably connected to each other. The lead lines 15 are brought into contact with the inner surfaces of the connecting portions 4c from the radially outer side and then electrically connected to the connecting portions 4c. Therefore, the lead lines 15 receive an equal load in the same direction (radially inward direction along the radial direction). The basal portions of the lead lines 15 are held by the end holding portions 13b. This stabilizes the electrical connection between the lead lines 15 and the connecting portions 4c.

The present embodiment has the advantages described below.

(1) In the substrate locating step, the edges of the lead lines 15 are separated radially outward relative to the connecting portions 4c to which the lead lines 15 are connected. Accordingly, the edges of the lead lines 15 can be aligned with the connecting portions 4c radially and circumferentially by moving the edges of the lead lines 15 with the positioning jigs 45 in the direction opposite to the separation direction α of the separation of the edges of the lead lines 15 relative to the connecting portions 4c (radially inward direction) in the lead line holding step and the positioning jig lifting step. The lead lines 15 inserted in the restraining portions 45a when the positioning jigs 45 are moved in the direction opposite to the separation direction α in the lead line holding step are pushed against the bottom parts of the restraining portions 45a (bottom parts of the holding grooves 45b) along the separation direction α. This enables the positioning jigs 45 to move the edges of the lead lines 15 in the direction opposite to the separation direction α while suppressing the movements of the lead lines 15 relative to the positioning jigs 45 in the separation direction α and the direction opposite to the separation direction α. The movements of the lead lines 15 in the direction that differs from the drawing direction of the lead lines 15 (axial direction of the stator core 2) and is orthogonal to the separation direction α (circumferential direction) are restricted by the restraining portions 45a having a recessed shape that can be easily formed. Therefore, the edges of the lead lines 15 can be moved by the positioning jigs 45 in the direction opposite to the separation direction α while restricting the movements of the lead lines 15 in the direction that differs from the drawing direction of the lead lines 15 and is orthogonal to the separation direction α. As a result, the distal portions of the lead lines 15 are easily aligned to the connecting portions 4c radially and circumferentially. This facilitates the electrical connection of the lead lines 15 of the coils 3 to the substrate 4 without any additional parts used in the prior art such as pins.

(2) In the positioning jig lifting step, the distal portions of the lead lines 15 can be aligned to the connecting portions 4c radially and circumferentially by locating the edge centers of the lead lines 15 in the inner walls of the connecting portions 4c when viewed from the axial direction. Since the edges of the lead lines 15 are already aligned to the connecting portions 4c in the positioning jig lifting step, the lead lines 15 can be easily inserted in the connecting portions 4c from the axial direction by simply moving the substrate 4 toward the stator core 2 along the axial direction of the stator core 2 in the edge inserting step.

(3) In the edge inserting step, the substrate 4 having the connecting portions 4c aligned with the lead lines 15 is moved toward the stator core 2 by the positioning jigs 45, while the edges of the lead lines 15 are still aligned with the connecting portions 4c by the positioning jigs 45. Therefore, the edges of the lead lines 15 are easily inserted in the connecting portions 4c simultaneously, and the step of inserting the edges of the lead lines 15 in the connecting portions 4c can be performed easily and efficiently.

(4) When the lead lines 15 are inserted in the restraining portions 45a by moving the positioning jigs 45 in the direction opposite to the separation direction α in the lead line holding step, the lead lines 15 are easily inserted in the restraining portions 45a by the guides 45c formed in the openings of the restraining portions 45a regardless of separation of the lead lines 15 from the bottom parts of the restraining portions 45a (bottom parts of the holding grooves 45b) in the direction that differs from the drawing direction of the lead lines 15 and is orthogonal to the separation direction α (circumferential direction).

(5) The holding grooves 45b, which are simply U-shaped when viewed from the axial direction, easily hold and restrict movement of the lead lines 15 in the direction that differs from the drawing direction of the lead lines 15 and is orthogonal to the separation direction α (circumferential direction).

(6) Since the basal portions of the lead lines 15 are immovable due to the end holding portions 13b relative to the stator core 2, the parts of the lead lines 15 closer to the basal portions more easily arranged at fixed positions relative to the stator core 2. Therefore, when the positioning jigs 45 are moved in the direction opposite to the separation direction α and the parts of the lead lines 15 closer to the basal side of the lead lines 15 than the center parts into the longitudinal direction are inserted in the restraining portions 45a, the insertion of the lead lines 15 in the restraining portions 45a is further facilitated. After the parts of the lead lines 15 inserted in the restraining portions 45a in the lead line holding step are aligned with the connecting portions 4c radially and circumferentially, the positioning jigs 45 are moved toward the substrate 4 along the axial direction in the positioning jig lifting step. Then, the parts of the lead lines 15 closer to the edges than the positioning jigs 45 are aligned to the connecting portions 4c radially and circumferentially. As a result, the positional alignment of the edges of the lead lines 15 to the connecting portions 4c is further facilitated.

(7) The twenty-four lead lines 15 are formed so that the lengths of the lead lines 15 from the parts immovable to the stator core 2 (parts inserted in the end holding portions 13b) to the edges are equal to one another. Therefore, the lead lines 15 can be held in the same manner by the positioning jigs 45. Since the lead lines 15 are held in the same manner by the positioning jigs 45, the edges of all of the lead lines 15 can be equally positioned in the axial direction when the edge of just one lead line 15 is aligned to the connecting portion 4c radially and circumferentially. As a result, the edges of the twenty-four lead lines 15 are easily inserted in the twenty-four connecting portions 4c simultaneously. When all of the positioning jigs 45 are arranged at the same position in the Z direction, the lengths of the parts of the lead lines 15 closer to the edge than the positioning jigs 45, that is, the parts closer to the substrate 4 than the positioning jigs 45, are equal in all of the lead lines 15. As a result, when the distal portions of the twenty-four lead lines are simultaneously inserted in the twenty-four connecting portions 4c of the substrate 4 in the edge inserting step, the insertion is more accurate and easy.

(8) The distal portions of the lead lines 15 are chamfered in a tapered shape so that the outer diameters are smaller reduced the edges. Therefore, the insertion of the edges of the lead lines 15 in the connecting portions 4c is further facilitated.

(9) The coils 3 are wound around the corresponding teeth 11b into concentrated windings, and the lead lines 15, the number of which is twice the number of the coils 3, are drawn out from the coils 3 to be arranged in the circumferential direction at equal angular intervals (intervals of 15°). The substrate 4 has the connecting portions 4c, the number of which is twice the number of the coils 3, formed as holes extending through the substrate 4 in the thickness direction, and the connecting portions 4c are arranged in the circumferential direction at equal angular intervals (intervals of 15°). In the lead line holding step, the lead lines 15, the number of which is twice the number of the coils 3, can be easily inserted in the restraining portions 45a by simply moving the positioning jigs 45 in the radial direction. This makes it unnecessary to move the positioning jigs 45 in a difficult direction (for example, direction tilted relative to the radial direction) in order to insert the lead lines 15 in the restraining portions 45a. As a result, the lead line holding step can be performed more easily.

(10) When using one positioning jig for each lead line 15, it becomes necessary to move a large number of positioning jigs, the number of which is the same as the total number of the lead lines 15, making the lead line holding step and the positioning jig lifting step complicated. In the present embodiment, each positioning jig 45 holds two lead lines 15. This reduces the number of the positioning jigs 45 to one half the number of the lead lines 15. This avoids complication of the lead line holding step and the positioning jig lifting step. The two lead lines 15 held by each positioning jig 45 and drawn out from two circumferential sides of the teeth 11b are easily positioned relative to the teeth 11b. Therefore, the two lead lines 15 drawn out from the two circumferential sides of the teeth 11b are suitable for being held by the two restraining portions 45a formed in one positioning jig 45.

(11) The basal portions of the lead lines 15 are held by the end holding portions 13b to be circumferentially immovable relative to the stator core 2 and guided by the end holding portions 13b so that the edges of the lead lines 15 are separated radially outward relative to the connecting portions 4c to which the lead lines 15 are connected. As a result, the substrate locating step, the lead line holding step, and the positioning jig lifting step are more easily performed.

(12) In the connecting step, the lead lines are pushed against the inner surfaces of the connecting portions by the positioning jigs and then electrically connected to the connecting portions. Therefore, the connecting portions and the lead lines are connected to each other in a manner that the lead lines are subtly movable in the connecting portions. This further facilitates the connection of the lead lines to the substrate. Further, the occurrence of a connection failure between the lead lines 15 and the connecting portions 4c is suppressed because the task for electrically connecting the lead lines 15 and the connecting portions 4c, such as soldering, is performed in a stable manner.

(13) The lead lines 15 extending outward in the radial direction from the connecting portions 4c are brought into contact with the inner surfaces of the connecting portions 4c and then electrically connected to the connecting portions 4c. Therefore, the lead lines 15 receive an equal load in the same direction (radially inward direction). When the lead lines 15 receive an equal load in the same direction, the lead lines 15 are uniformly connected to the corresponding connecting portions 4c in a stable manner.

(14) The basal portions of the lead lines 15 are held by the end holding portions 13b. Thus, the electrical connection between the lead lines 15 and the connecting portions 4c is stabilized. Before the lead lines 15 are inserted in the connecting portions 4c (for example, before the stator core locating step) when manufacturing the stator 1, the lead lines 15 are tilted in the same manner due to the end holding portions 13b. This facilitates the handling of the lead lines 15. As a result, the production of the stator 1 is facilitated.

(15) After the positioning jigs 45 are moved toward the substrate 4 in the positioning jig lifting step, the lengths of the lead lines 15 protruding from the upper surfaces of the positioning jigs 45 toward the substrate 4 are shortened. This makes it difficult for the lead lines 15 to tilt between the positioning jigs 45 and the substrate 4, thereby facilitating the alignment of the edges of the lead lines 15 with the connecting portions 4c in the radial and circumferential directions. Further, the edges of the lead lines 15 can be further easily inserted into the connecting portions 4c in the edge inserting step.

(16) The positioning jigs 45 can be easily moved in the radial direction simultaneously by the cam mechanism.

(17) The positioning jigs 45 are moved in two directions which are the radial and axial directions, and the substrate holding tool 28 is moved in the axial direction. As a result of such simple movements, the lead lines 15 can be inserted into the connecting portions 4c.

It should be apparent to those skilled in the art that the present invention may be embodied in many other specific forms without departing from the spirit or scope of the invention. Particularly, it should be understood that the present invention may be embodied in the following forms.

The structure for positioning the basal portions of the lead lines 15 relative to the stator core 2 in an immovable manner is not limited to the end holding portion 13b of the present embodiment. For example, two end holding portions 61a illustrated in FIG. 15A, which are formed in an end surface cover 13a of an insulator 61, are arranged at circumferential sides of the teeth 11b proximal to the basal portions of the teeth 11b (see FIG. 1) in the same manner as the end holding portions 13b according to the embodiment. The end holding portions 61a are open toward one axial side (at the opposite side of the core segments 11) and directed inward in the radial direction. The end holding portion 61a has a circumferential width that is slightly larger than the diameter of the lead line 15 (coated conductor wire 14). A bottom surface 61c of each end holding portion 61a on the radially outer side has a shape similar to that of the bottom surface 13c of the end holding portion 13b of the above embodiment. Each end holding portions 61a has semicircular holding protrusions 61b on inner side surfaces at both circumferential sides. The two holding protrusions 61b are formed at positions facing each other in the circumferential direction and partly reduce the circumferential width of the end holding portion 61a. The basal portion of the lead line 15 is pressed into between the two holding protrusions 61b and extends over the holding protrusions 61b. Then, the basal portion is received in the end holding portion 61a at a position closer to the bottom surface 61c than the holding protrusions 61b.

Figure 15A:
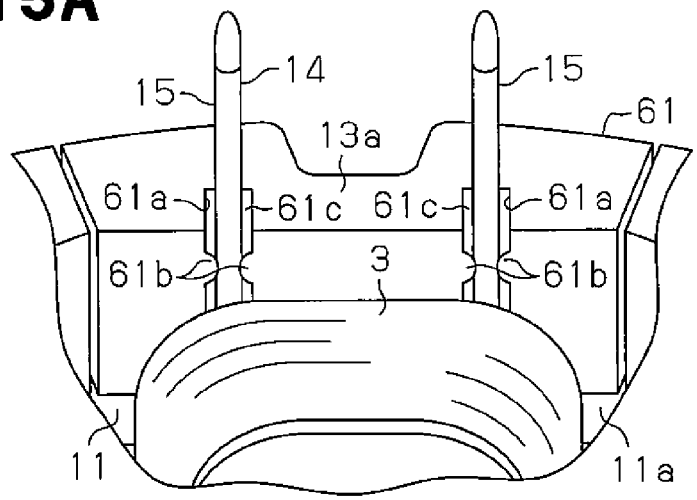
FIGS. 15A to 15C are partially enlarged perspective views of the stator core with an insulator in a further embodiment.
Figure 15B:
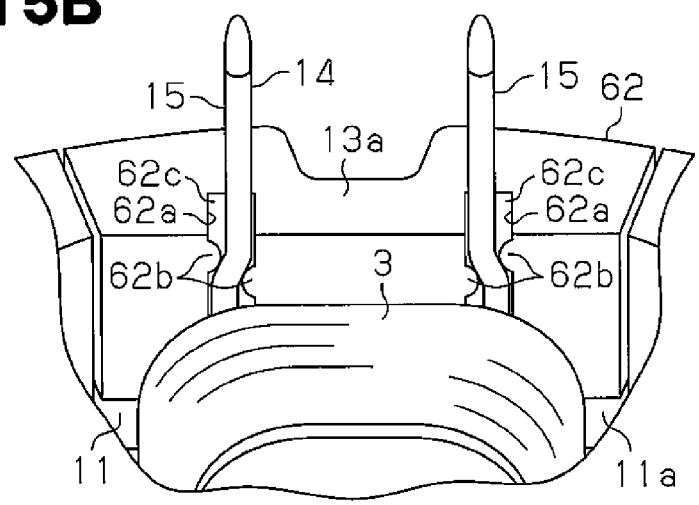

For example, two end holding portions 62a illustrated in FIG. 15B, which are formed in an end surface cover 13a of an insulator 62, are arranged at two circumferential sides of the corresponding tooth 11b near the basal portion of the tooth 11b (see FIG. 1) in the same manner as the end holding portions 13b of the above embodiment. The end holding portions 62a are open at one axial side (at the opposite side of the core segments 11) and the radially inner side. The end holding portion 62a has a circumferential width slightly larger than the diameter of the lead line 15 (coated conductor wire 14). A bottom surface 62c of each end holding portion 62a on the radially outer side has a shape similar to that of the bottom surface 13c of the end holding portion 13b in the above embodiment. Each end holding portion 62a has semicircular holding protrusions 62b on inner side surfaces on both circumferential sides. The two holding protrusions 62b are formed at positions separated in the axial direction and reduce the circumferential width of part of the end holding portion 62a. Then, the basal portion of the lead line 15 is curved between the two holding protrusions 62b and fitted to and held in the end holding portion 62a.

Figure 15C:
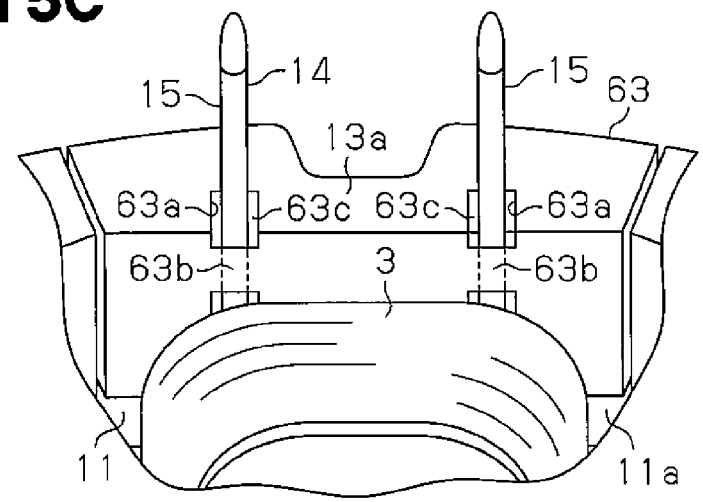

For example, two end holding portions 63a illustrated in FIG. 15C, which are formed in an end surface cover 13a of an insulator 63, are arranged at the two circumferential sides of each tooth 11b near the basal portion of the tooth 11b (see FIG. 1) in the same manner as the end holding portions 13b of the above embodiment. The end holding portions 63a open at one axial side (at the opposite side of the core segments 11) and the radially inner side. The end holding portion 63a has a circumferential width slightly larger than the diameter of the lead line 15 (coated conductor wire 14). A bottom surface 63c of each end holding portion 63a on the radially outer side has a shape similar to that of the bottom surface 13c of the end holding portion 13b in the above embodiment. Each end holding portion 63a has a caulking part 63b partly sealing the opening formed on the radially inner side. Before the basal portion of the lead line 15 is inserted in the end holding portion 63a, the opening of the end holding portion 63a on the radially inner side is not closed by the caulked part 63b. After the basal portion of the lead line 15 is inserted in the end holding portion 63a, the caulking part 63b is thermally caulked and the so that the caulking part 63b partly seals the opening of the end holding portion 63a at the radially inner side.

The end holding portions 61a, 62a, and 63a illustrated in FIGS. 15A to 15C obtain advantages (6), (11), and (14) of the above embodiment.

In the above embodiment, the bottom surface 13c of each end holding portion 13b has a shape that guides and tilts the lead line 15 so that the distal portion of the lead line 15 is separated outward in the radial direction from the basal portion of the lead line 15. However, the bottom surface 13c does not have to be formed to guide and tilt the lead line 15. For example, the bottom surface 13c may be formed in parallel with the axial direction. Further, the insulator 13 does not necessarily have to include the end holding portion 13b.

The insulator 13 is provided in each core segment 11 in the above embodiment. However, the core segment 11 does not necessarily have to be provided with the insulator 13. When omitting the insulators 13 from the core segments 11, for example, the surfaces of the core segments 11 are coated with an insulating material.

In the above embodiment, the connecting portions 4c are formed at positions radially equal to the positions of the basal portions of the connected lead lines 15. The connecting portions 4c may be formed more radially outward than the basal portions of the connected lead lines 15. In such a case, the lead lines 15 may be extended from positions more radially inward than the connecting portions 4c and brought into contact with the inner surfaces of the connecting portions 4c and then electrically connected to the connecting portions 4c. In this case, the edges of the lead lines 15 extending through the connecting portions 4c can be more distantly spaced from one another in the circumferential direction than the structure in which the connecting portions 4c are located more radially inward than the basal portions of the lead lines 15, and the lead lines 15 extending from positions more radially outward than the connecting portions 4c and in contact with the inner surfaces of the connecting portions 4c are electrically connected to the connecting portions 4c. As a result, the edges of the lead lines 15 extending through the connecting portions 4c are prevented from being closely located to each other. This reduces the possibility of short circuit between the edges of the lead lines 15 extending through the connecting portions 4c and makes it easier to connect the lead lines 15 to the connecting portions 4c. Further, this can increase the area of the part of the substrate 4 at the radially inner side of the connecting portions 4c and allow for the formation of a larger circuit in the part.

In the above embodiment, the lead lines 15 are extended from the radially outer side than the connecting portions 4c and brought into contact with the inner surfaces of the connecting portions 4c and then electrically connected to the connecting portions 4c. However, the lead lines 15 may be extended from a position other than the radially outer side of the connecting portions 4c (for example, position separated inward in the radial direction or separated in the circumferential direction) and brought into contact with the inner surfaces of the connecting portions 4c and then electrically connected to the connecting portions 4c. When the lead lines 15 that extend from the radially inner side of the connecting portions 4c and are in contact with the inner surfaces of the connecting portions 4c are electrically connected to the connecting portions 4c, advantage (14) of the above embodiment can be obtained. It is unnecessary for the lead lines 15 to be in contact with the inner surfaces of the connecting portions 4c when electrically connected to the connecting portions 4c.

In the connecting step of the above embodiment, the lead lines 15 are pushed against the inner surfaces of the connecting portions 4c by the positioning jigs 45 and then electrically connected to the connecting portions 4c. In the connecting step, however, it is unnecessary for the lead lines 15 to be pushed against the inner surfaces of the connecting portions 4c by the positioning jigs 45 when the lead lines 15 and the connecting portions 4c are electrically connected to each other. In such a case, after the lead lines 15 are inserted in the connecting portions 4c, the positioning jigs 45 may be moved to the retraction positions before the connecting step is performed. After the positioning jigs 45 are moved to the retraction positions, the substrate holding tool 28 may be lowered to move the substrate 4 along the axial direction toward the stator core 2 before the connecting step is performed.

Figure 16A:
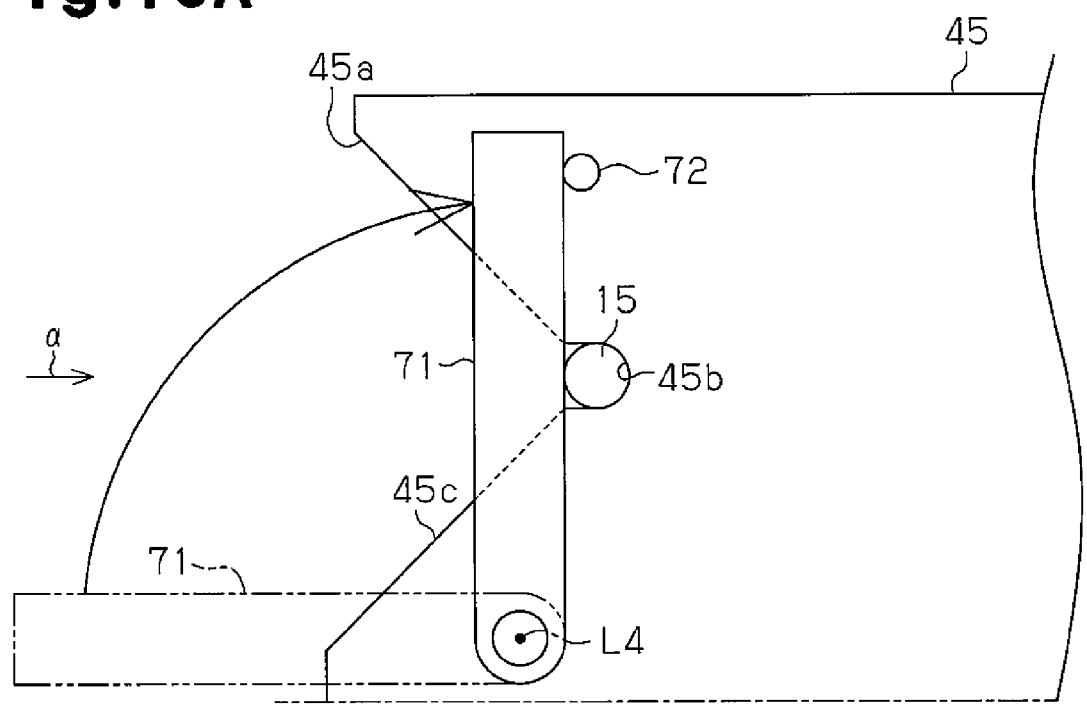
FIGS. 16A and 16B are partially enlarged views of positioning jigs in a further embodiment.

The manufacturing apparatus 21 may be provided with stoppers for preventing the lead lines 15 inserted in the restraining portions 45a from moving out of the restraining portions 45a. In the example illustrated in FIG. 16A, a basal portion of a stopper 71 formed in a bar-like shape is rotatably connected to a part of the restraining portion 45a of the positioning jig 45 at one of its two end sides (part lower than the restraining portion 45a in the illustration of FIG. 16A). A restriction protrusion 72 is formed in a part of the restraining portion 45a of the positioning jig 45 on the other one of the two sides (part higher than the restraining portion 45a in the illustration of FIG. 16A. A distal portion of the stopper 71 rotating around a basal portion serving as a rotational center is in contact with the restriction protrusion 72 from the opening side of the restraining portion 45a in the radial direction. The stopper 71 is rotated around a rotation axis L4 serving as a rotational center and extended in parallel with the thickness direction of the positioning jig 45. After the positioning jigs 45 are moved in the direction opposite to the separation direction α and the lead lines 15 are inserted in the holding grooves 45b of the restraining portions 45a in the lead line holding step, the stoppers 71 are rotated from the opening side of the restraining portions 45a to the bottom side of the restraining portions 45a (from a position illustrated by broken lines to a position illustrated by solid lines in FIG. 16A) until the stoppers 71 comes into contact with the restriction protrusions 72. Therefore, the lead lines 15, when moving relative to the holding grooves 45b in the direction opposite to the separation direction α, are brought into contact with the stoppers 71 and prevented by the stoppers 71 from moving out of the restraining portions 45a. In the positioning jig lifting step, the distal portions of the lead lines 15 prevented by the stoppers 71 from moving out of the restraining portions 45a are aligned to the connecting portions 4c radially and circumferentially by the positioning jigs 45.

Figure 16B:
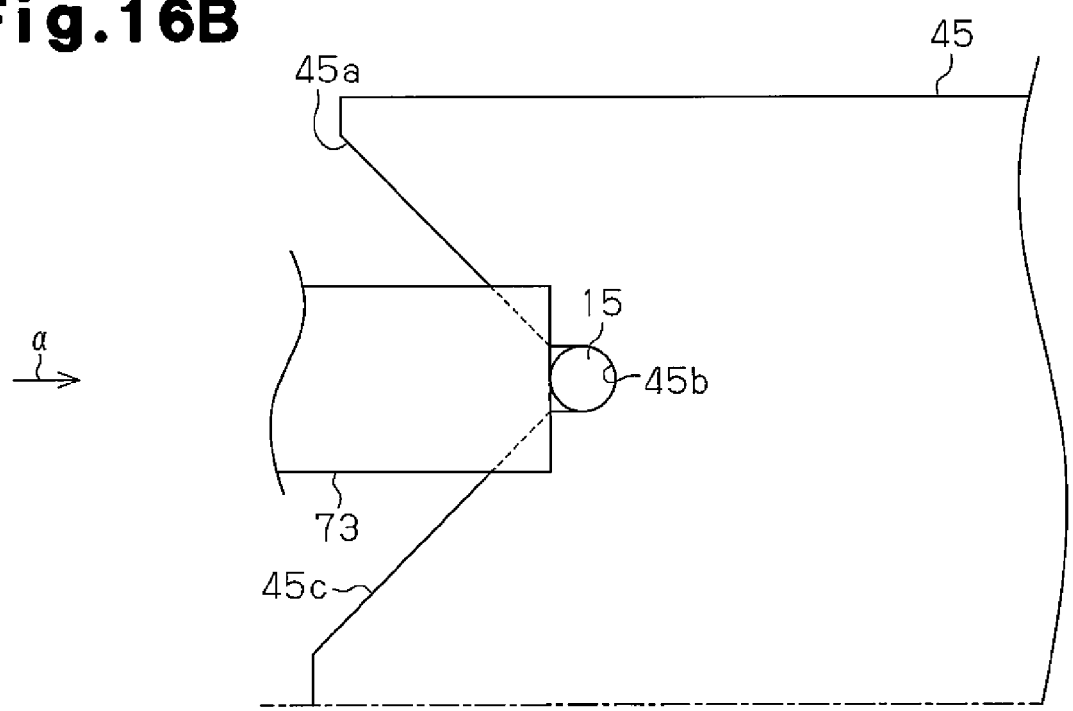

For example, a stopper 73 illustrated in FIG. 16B moves from the radially inner side along the separation direction α and comes into contact with the lead line 15 inserted in the restraining portion 45a. In this case, after the positioning jigs 45 are moved in the direction opposite to the separation direction α and the lead lines 15 are inserted in the holding grooves 45b of the restraining portions 45a in the lead line holding step, the stoppers 73 are moved in the separation direction α to positions axially (vertically in FIG. 16B) overlapping the restraining portions 45a (preferably, to positions axially overlapping the openings of the holding grooves 45b formed in the radial direction). Therefore, the lead lines 15, when moving relative to the holding grooves 45b in the direction opposite to the separation direction α, are brought into contact with the stoppers 73 and prevented by the stoppers 73 from moving out of the restraining portions 45a. In the positioning jig lifting step, the distal portions of the lead lines 15 thus prevented by the stoppers 73 from moving out of the restraining portions 45a are aligned to the connecting portions 4c radially and circumferentially by the positioning jigs 45.

By providing the stoppers 71 (or stoppers 73) in the manufacturing apparatus 21, the lead lines 15 inserted in the restraining portions 45a are prevented by the stoppers (or stoppers 73) from moving out of the restraining portions 45a. Thus, while the distal ends of the lead lines 15 are prevented from moving out of the restraining portions 45a, the lead lines 15 are radially and circumferentially aligned with the connecting portions 4c by the positioning jigs 45.

In the above embodiment, each positioning jig 45 is configured to hold two lead lines 15 adjacent in the circumferential direction. The positioning jig, however, may be configured to hold three or more lead lines 15 that are arranged adjacently in the circumferential direction. In this case, the restraining portions 45a are formed in the positioning jigs in accordance with the number of the lead lines 15. The positioning jig may be configured to hold one lead line 15.

In the above embodiment, the positioning jigs 45 are provided on the radially outer side of the lead lines 15 arranged in the circumferential direction, and then moved radially inward in the lead line holding step. The positioning jigs 45, however, may be provided on the radially inner side of the lead lines 15 arranged in the circumferential direction, and then moved radially outward in the lead line holding step. In this case, the restraining portions 45a of the positioning jigs 45 are open at the radially outer side. The positioning jigs 45 are moved radially outward in the lead line holding step. In the substrate locating step and the lead line holding step, therefore, the lead lines 15 are positioned relative to the substrate 4 so that the edges of the lead lines 15 are separated inward in the radial direction relative to the connecting portions 4c to which the lead lines 15 are connected.

In the above embodiment, the stator 1 has the lead lines 15, the number of which is twice the number of the coils 3 wound around the teeth 11b in concentrated windings, and the substrate 4 has the hole-like connecting portions 4c extending through the substrate 4 in the thickness direction and provided with twice the number of the coils (same as the number of the lead lines 15). However, the number of the lead lines 15 provided in the stator 1 is not limited in such a manner. The number of the connecting portions 4c provided in the substrate 4 is can be changed in accordance with the number of the lead lines 15 provided in the stator 1. When, for example, the coil 3 wound around one of the tooth 11b continues to be wound around another one of the tooth 11b without cutting the coated conductor wire 14, the number of the lead lines 15 decreases. In this case, the number of connecting portions 4c in the substrate 4 is in accordance with the decreased number of the lead lines 15.

Figure 14A:
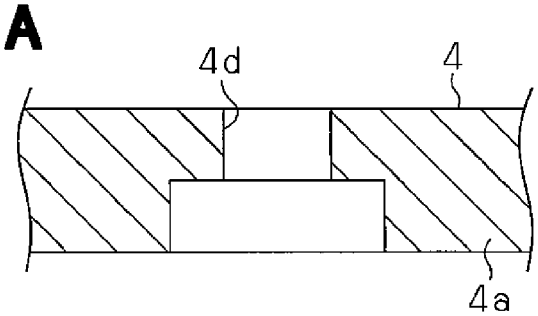
FIGS. 14A and 14B are enlarged sectional views of substrates in a further embodiment.
Figure 14B:
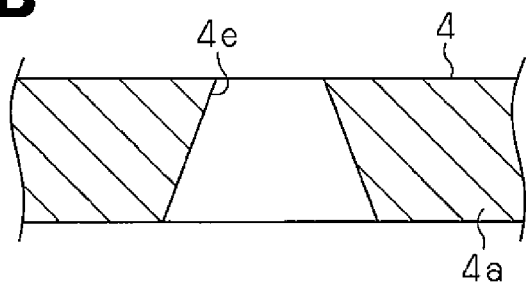

In the above embodiment, the connecting portion 4c has a uniform cross-sectional shape in the thickness direction of the substrate 4 taken in the direction orthogonal to the axial direction of the stator core 2. The connecting portion 4c, however, may have different cross-sectional shape. For example, a part of the connecting portion 4c proximal to the stator core 2 may have a larger cross-sectional area than a part distant from the stator core 2. Referring to a connecting portion 4d illustrated in FIG. 14A, an end facing the stator core 2 (lower end in the illustration of FIG. 14A) has a larger diameter than an end at the opposite side of the end facing the stator core 2 (upper end in the illustration of FIG. 14A). A connecting portion 4e illustrated in FIG. 14B has a diameter that gradually increase from an end opposite to the end facing the stator core 2 (upper end in the illustration of FIG. 14B) toward the end facing the stator core 2 (lower end in the illustration of FIG. 14A). This facilitates the insertion of the distal ends of the lead lines 15 into the connecting portions 4d (or connecting portions 4e).

In the above embodiment, the distal portion of the lead line 15 is chamfered so that the outer diameter decreases toward the distal end. However, the chamfering may be changed so that the outer diameter of the lead line 15 decreases toward the distal end. For example, the distal end of the lead line 15 may be soldered so that the outer diameter decreases toward the distal end. The distal portion of the lead line 15 does not necessarily have to be formed so that the outer diameter decreases toward the distal end.

In the above embodiment, the twenty-four lead lines 15 are formed so that the lengths of the lead lines from the parts immovable relative to the stator core 2 (parts inserted in the end holding portions 13b) to the distal ends are all equal. However, the twenty-four lead lines may have different lengths.

In the above embodiment, the stator core 2 is provided at such a position in the stator core locating step that the distance D1 in the Z direction between the part of each lead line 15 on the basal portion located in the axial opening of the end holding portion 13b and the positioning jig 45 is less than or equal to 10 mm. However, the distance D1 may have a value larger than 10 mm as far as the lead lines 15 are insertable in the restraining portions 45a of the positioning jigs 45 radially moved in the lead line holding step.

In the above embodiment, the restraining portion 45a has the holding groove 45b, which is U-shaped as viewed from the axial direction, in the bottom part. However, the restraining portion 45a is not necessarily provided with the holding groove 45b. For example, the restraining portion 45a having no holding groove 45b may be formed with a V-shaped opening in the direction opposite to the separation direction α when viewed from the axial direction.

In the above embodiment, the restraining portion 45a has the guide 45c in the opening formed in the direction opposite to the separation direction α. However, the restraining portion 45a does not necessarily have to be provided with the guide 45c. For example, the restraining portion 45a having no guide 45c may be formed in a U-shaped opening in the direction opposite to the separation direction α when viewed from the axial direction.

In the above embodiment, after the substrate 4 is moved toward the stator core 2 before the positioning jigs 45 in the edge inserting step, the substrate 4 and the positioning jigs 45 are moved at the same time toward the stator core 2 in the positioning jig lowering step. However, the edge inserting step may be omitted to start the positioning jig lowering step immediately after the positioning jig lifting step is over. Then, the distal portions of the lead lines 15 can be aligned with the connecting portions 4c radially and circumferentially so that the distal end centers of the lead lines 15 are located in the connecting portions 4c when viewed from the axial direction in the positioning jig lifting step. The distal ends of the lead lines 15 are thus aligned to the connecting portions 4c in the positioning jig lifting step. Therefore, when the substrate 4 and the positioning jigs 45 are moved toward the stator core 2 along the axial direction of the stator core 2 in the positioning jig lowering step, the lead lines 15 can be easily inserted in the connecting portions 4c from the axial direction.

Figure 17A:
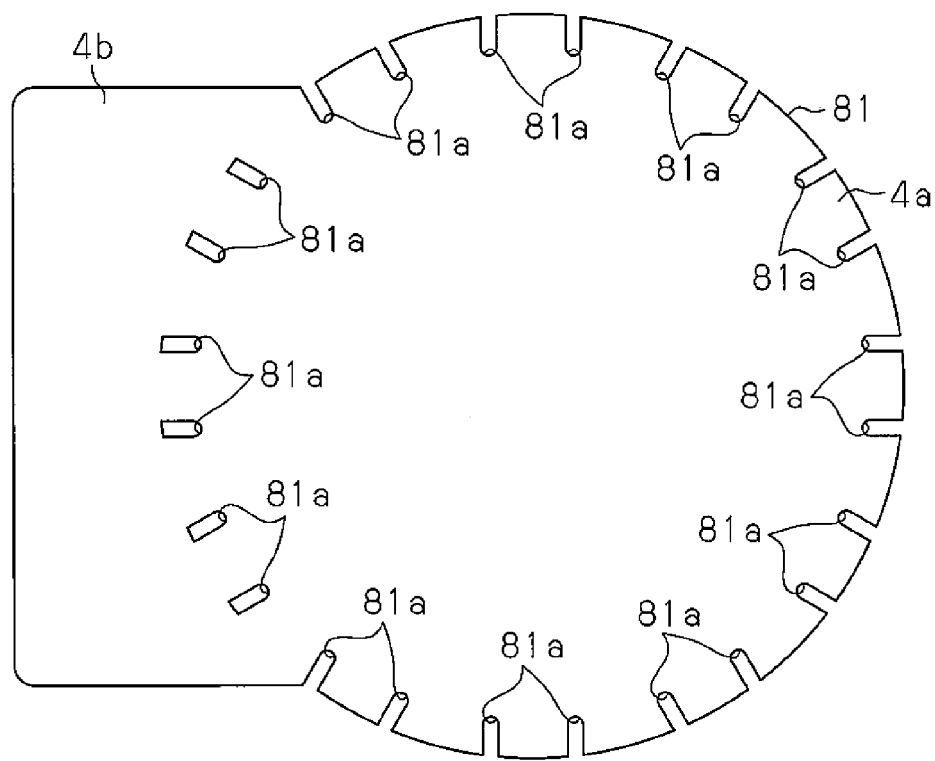
FIGS. 17A and 17B are plan views of substrates in further embodiments.

In the above embodiment, the connecting portion 4c is a hole extending through the substrate 4 in the thickness direction. However, the shape of the connecting portion 4c is not limited to that of the above embodiment as long as the connecting portion 4c is extended through the substrate 4. For example, connecting portions 81a of a substrate 81 are formed in the peripheral edge of the substrate body 4a as illustrated in FIG. 17A. The connecting portions 81a each has a groove-like shape axially extending through the substrate body 4a and extending radially. The connecting portions 81a are circumferentially formed at equal angular intervals. Further, the connecting portions 81a formed in a part of the outer peripheral edge of the substrate body 4a not adjacent to the external connector 4b are open radially outward. When the connecting portions 81a are radially open, the substrate 81 is separated from the stator core 2 by a distance shorter than the lengths of the lead lines 15 in the substrate locating step. Then, the substrate lowering step, the positioning jig lifting step, the edge inserting step, and the positioning jig lowering step are omitted but the lead line holding step, in which the lead lines 15 are moved by the positioning jigs 45 along the direction opposite to the separation direction α (radially inward direction), is solely performed. Then, the lead lines 15 can be inserted in the connecting portions 81a from the radial direction, and the distal ends of the lead lines 15 can be aligned with the connecting portions 81a at the same time. Since the connecting portions 81a formed in a part of the peripheral edge of the substrate body 4a adjacent to the external connector 4b are also groove-shaped extending in the radial direction, the lead lines 15 can be inserted in the connecting portions 81a in the sequence of steps described above.

Figure 17B:
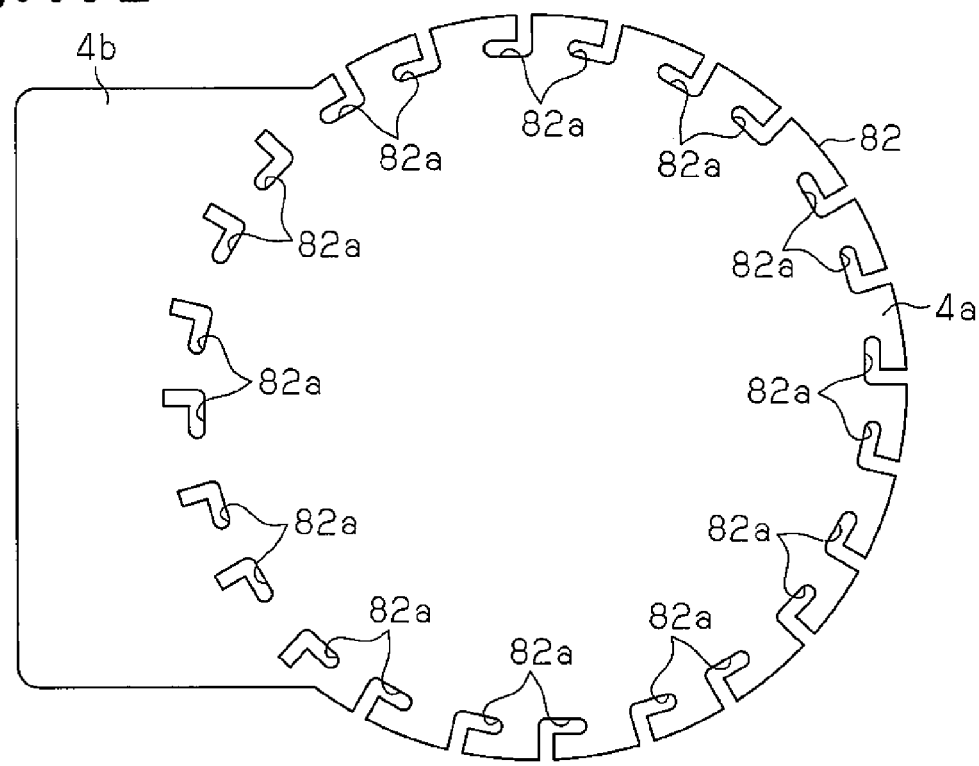

A plurality of connecting portions 82a of a substrate 82 illustrated in FIG. 17B are formed in an peripheral edge of the substrate body 4a in a groove-shaped manner extending axially through the substrate body 4a. The connecting portions 82a are formed at equal angular intervals in the circumferential direction. The connecting portions 82a are extending radially inward from the peripheral edge of the substrate body 4a and then bent along the circumferential direction. The connecting portions 82a are thus hook-shaped when viewed from the axial direction. Further, the connecting portions 82a formed in a part of the outer peripheral edge of the substrate body 4a not adjacent to the external connector 4b are open outward in the radial direction. The lead lines 15 can be inserted in the connecting portions 82a thus formed in a manner similar to the insertion of the lead lines 15 in the connecting portions 81a illustrated in FIG. 17A. The bottom parts of the connecting portions 82a are circumferentially separated relative to the openings. Therefore, when the lead lines 15 are inserted in the connecting portions 82a until they reach the bottom parts, the lead lines 15 are prevented from moving out of the connecting portions 82a in the radial direction. This facilitates the connecting step.

In the above embodiment, the lead lines 15 before being aligned with the connecting portions 4c are located relative to the substrate 4 so that the distal ends of the lead lines 15 are separated outward in the radial direction relative to the connecting portions 4c to which the lead lines 15 are connected. However, the lead lines 15 before being aligned with the connecting portions 4c may be located relative to the substrate 4 so that the distal ends of the lead lines 15 are separated from the connecting portions 4c to which the lead lines 15 are connected in at least one of the radial and circumferential directions. The separation direction α of the separation of the distal ends of the lead lines 15 from the connecting portions 4c conforms to a direction extending from the connecting portions 4c toward the edges of the lead lines 15 when viewed from the axial direction of the stator core 2. For example, the lead lines 15 before being aligned with the connecting portions 4c may be located relative to the substrate 4 so that the distal ends of the lead lines 15 are separated in the circumferential direction from the connecting portions 4c to which the lead lines 15 are connected. For example, the lead lines 15 before being aligned with the connecting portions 4c may be located relative to the substrate 4 so that the distal ends of the lead lines 15 are separated relative to the connecting portions 4c to which the lead lines 15 are connected in a direction tilted relative to the radial direction (separated in both of the radial and circumferential directions). In each case, the positioning jigs 45 are moved in the direction opposite to the separation direction α, and the lead lines 15 are inserted in the restraining portions 45a in the lead line holding step. In each case, the restraining portions 45a are formed in a recessed shape opening in the direction opposite to the separation direction α of the separation of the edges of the lead lines 15 to the connecting portions 4c to allow the lead lines 15 inserted therein to move in the drawing direction but restrain the lead lines 15 from moving in the direction different to the drawing direction and orthogonal to the separation direction α.

In the above embodiment, the substrate locating step is performed after the stator core locating step. However, the stator core locating step may be performed after the substrate locating step. In this case, the stator core locating step corresponds to the locating step.

In the above embodiment, after the positioning jigs 45 are lifted in the positioning jig lifting step, the lengths of the lead lines 15 protruding from the upper surfaces of the positioning jigs 45 toward the substrate 4 are 1 mm to 1.5 mm. However, the lengths are not limited in such a manner. For example, the lengths of the lead lines 15 protruding from the upper surfaces of the positioning jigs 45 toward the substrate 4 may be less than or equal to 1 mm.

The diameter of the coated conductor wire 14 in the above embodiment is 0.3 mm. However, the diameter of the coated conductor wire 14 is not limited in such a manner. For example, the diameter of the coated conductor wire 14 may be 0.7 mm. The width Wa of the holding groove 45b and the curvature radius of the bottom part of the holding groove 45b are changed in accordance with the diameter of the coated conductor wire 14.

In the above embodiment, the thickness of the positioning jig 45 is less than or equal to 1 mm. However, the thickness of the positioning jig 45 may be greater than 1 mm.

In the above embodiment, the coils 3 are wound around the teeth 11b in concentrated windings. As long as the coils 3 are wound around the teeth 11b, the winding is not limited to the concentrated winding.

The stator 1 in the above embodiment is provided in an inner rotor brushless motor. However, a stator for an outer rotor brushless motor may be manufactured by the manufacturing method and the manufacturing apparatus according to the present invention.

The present examples and embodiments are to be considered as illustrative and not restrictive, and the invention is not to be limited to the details given herein, but may be modified within the scope and equivalence of the appended claims.

The invention claimed is:

1. A method for manufacturing a stator, the method comprising:
   preparing an annular stator core having a circumferential direction, a radial direction, and an axial direction and including a plurality of teeth arranged in the circumferential direction;
   preparing a plurality of coils respectively wound around the teeth, wherein the coils include a plurality of lead lines drawn in a drawing direction toward outside from one axial end of the stator core;
   preparing a substrate that is arranged to face the one axial end of the stator core, wherein the substrate includes a plurality of connecting portions extending through the substrate in a thickness direction of the substrate and electrically connected to the lead lines, respectively;
   positioning the substrate and the lead lines so that distal portions of the lead lines are separated in a separation direction from the corresponding connecting portions, wherein the separation direction is at least one of the radial direction and the circumferential direction;
   preparing a plurality of positioning jigs, each including a recessed restraining portion that receives one of the lead lines, wherein the restraining portion includes an opening directed in a direction opposite to the separation direction of the corresponding lead line, and the restraining portion, when receiving the lead line, allows movement of the lead line along the drawing direction and restricts movement of the lead line in a direction orthogonal to the separation direction that differs from the drawing direction;
   inserting the lead lines into the restraining portions by moving the positioning jigs in the direction opposite to the separation direction;
   aligning the distal portions of the lead lines with the corresponding connecting portions in the radial direction and the circumferential direction using the positioning jigs;
   inserting the lead lines into the corresponding connecting portions; and
   electrically connecting the lead lines, which are inserted into the connecting portions, to the connecting portions.

2. The method according to claim 1, wherein
when positioning the substrate and the lead lines, the substrate is arranged to face the one axial end of the stator core so that the thickness direction of the substrate conforms to the axial direction and so that the substrate is spaced apart from the stator core in the axial direction by a distance that is greater than a length of the lead lines,
when aligning the distal portions of the lead lines with the connecting portions, the positioning jigs move the distal portions in the direction opposite to the separation direction so that centers of the distal portions are arranged in ranges of the corresponding connecting portions as viewed from the axial direction, and
when inserting the lead lines into the connecting portions, the substrate is moved toward the stator core along the axial direction so that the distal portions are inserted into the corresponding connecting portions along the axial direction for arrangement in the connecting portions.

3. The method according to claim 2, wherein when inserting the lead lines into the connecting portions, only the substrate is moved toward the stator core or the substrate and the positioning jigs are simultaneously moved toward the stator core so that the distal portions are simultaneously inserted into the connecting portions along the axial direction for arrangement in the connecting portions.

4. The method according to claim 1, wherein
the openings each include a guide that has a width in the direction orthogonal to the separation direction that differs from the drawing direction, wherein the width increase toward the direction opposite to the separation direction, and
when aligning the distal portions, the lead lines are inserted into the restraining portions from the guides as the positioning jigs move in the direction opposite to the separation direction.

5. The method according to claim 4, wherein
the restraining portions each includes a bottom part defining a holding groove that is U-shaped as viewed from the axial direction,
the holding groove is continuous with the guide and opens in the direction opposite to the separation direction,
the bottom part of the holding groove includes a semicircular inner surface extending along an outer surface of the corresponding lead line,
the bottom part of the holding groove has a width allowing for restriction of movement of the corresponding lead line in the direction orthogonal to the separation direction that differs from the drawing direction, and
when aligning the distal portions, the lead lines are inserted into the holding grooves as the positioning jigs are moved in the direction opposite to the separation direction.

6. The method according to claim 1, wherein
the lead lines each include a basal portion that is arranged to be immovable relative to the stator core, and
when aligning the distal portions, the positioning jigs are moved in the direction opposite to the separation direction so that parts of the lead lines closer to the basal portions than longitudinally central parts of the lead lines are inserted into the restraining portions and so that parts of the lead lines inserted into the restraining portions are aligned with the connecting portions in the radial direction and the circumferential direction, and the positioning jigs are then moved toward the substrate along the axial direction to align the distal portions with the connecting portions in the radial direction and the circumferential direction.

7. The method according to claim 1, wherein
the lead lines each includes a basal portion that is arranged to be immovable to the stator core, and
the lead lines each have a length from the basal portion to the distal portion, and the lengths of the lead lines are the same.

8. The method according to claim 1, wherein the distal portions are shaped to be tapered.

9. The method according to claim 1, wherein
the connecting portions each include a part proximal to the stator core and a part distant from the stator core, and
the proximal part has a larger cross-sectional area than the distant part.

10. The method according to claim 1, wherein
the coils are each wound around the corresponding tooth in a concentrated winding,
the number of lead lines is twice the number of the coils, and the lead lines are arranged at equal angular intervals along the circumferential direction,
the substrate includes the connecting portions, the number of which is twice the number of the coils,
each of the connecting portions is a hole extending through the substrate in the thickness direction,
the connecting portions are arranged at equal angular intervals along the circumferential direction, and
when aligning the distal portions, the positioning jigs are moved along the radial direction so that the restraining portions receive the lead lines.

11. The method according to claim 10, wherein
each of the coils includes two of the lead lines, one at a winding-initiating end and the other at a winding-terminating end, and the two lead lines respectively extend from two circumferential sides of the corresponding tooth,
the number of the positioning jigs is equal to the number of the teeth,
each of the positioning jigs includes two of the restraining portions respectively facing, in the radial direction, the two lead lines extending from the corresponding tooth, and
when aligning the distal portion, the positioning jigs are moved along the radial direction so that the two restraining portions of each positioning jig receive the corresponding two lead lines.

12. The method according to claim 1, wherein
the positioning jigs each include a stopper that prevents the lead line received in the restraining portion from moving out of the restraining portion, and
when aligning the distal portions, the stoppers prevent the lead lines from moving out of the restraining portions.

13. The method according to claim 1, wherein
the stator includes an insulator arranged on the stator core to insulate the stator core from the coils,
the insulator includes an end holding portion located proximal to the one axial end of the stator core, the end holding portion holds basal portions of the lead lines so that the basal portions are immovable relative to the stator core in the circumferential direction and guide the lead lines to be tilted relative to the axial direction,
when positioning the substrate and the lead lines, the end holding portion tilts the lead lines and separates the distal portions from the connecting portions along the separation direction.

14. The method according to claim 1, wherein the lead lines are electrically connected to the connecting portions in a state in which the positioning jigs force the lead lines against inner surfaces of the connecting portions.

15. An apparatus for manufacturing a stator, wherein the stator includes
an annular stator core having a circumferential direction, a radial direction, and an axial direction and including a plurality of teeth arranged in the circumferential direction,
a plurality of coils respectively wound around the teeth, wherein the coils include a plurality of lead lines drawn in a drawing direction toward outside from one axial end of the stator core,
a substrate arranged to face the one axial end of the stator core, wherein the substrate includes a plurality of connecting portions extending through the substrate in a thickness direction of the substrate and electrically connected to the lead lines, respectively,
the apparatus comprising:
a substrate holding tool that positions the substrate to face the one axial end of the stator core, wherein the substrate holding tool holds the substrate so that distal portions of the lead lines are separated in a separation direction from the corresponding connecting portions, wherein the separation direction is at least one of the radial direction and the circumferential direction;
a plurality of positioning jigs, each including a recessed restraining portion that receives one of the lead lines, wherein the restraining portion includes an opening directed in a direction opposite to the separation direction of the corresponding lead line, and the restraining portion, when receiving the lead line, allows movement of the lead line along the drawing direction and restricts movement of the lead line in a direction orthogonal to the separation direction that differs from the drawing direction,
wherein the positioning jigs are moved in the direction opposite to the separation direction to insert the lead lines into the restraining portions, and the positioning jigs then align the distal portions of the lead lines with the corresponding connecting portions in the radial direction and the circumferential direction.

16. The apparatus according to claim 15, wherein
the substrate holding tool holds the substrate so that the substrate is arranged to face the one axial end of the stator core and the thickness direction of the substrate conforms to the axial direction, and the substrate holding tool holds the substrate so that the substrate is spaced apart from the stator core in the axial direction by a distance that is greater than a length of the lead lines,
the positioning jigs move the distal portions in the direction opposite to the separation direction so that centers of the distal portions are arranged in ranges of the corresponding connecting portions as viewed from the axial direction, and
the substrate holding tool moves so as to move the substrate toward the stator core along the axial direction so that the distal portions are inserted into the corresponding connecting portions along the axial direction for arrangement in the connecting portions.

17. The apparatus according to claim 16, wherein
only the substrate holding tool is moved toward the stator core or the substrate holding tool and the positioning jigs are simultaneously moved toward the stator core so that the distal portions are simultaneously inserted into the connecting portions along the axial direction for arrangement in the connecting portions.

18. The apparatus according to claim 15, wherein the openings each include a guide that has a width in the direction orthogonal to the separation direction that differs from the drawing direction, and the width increase toward the direction opposite to the separation direction.

19. The apparatus according to claim 18, wherein
the restraining portions each includes a bottom part defining a holding groove that is U-shaped as viewed from the axial direction,
the holding groove is continuous with the guide and opens in the direction opposite to the separation direction,
the bottom part of the holding groove includes a semicircular inner surface extending along an outer surface of the corresponding lead line, and
the bottom part of the holding groove has a width allowing for restriction of movement of the corresponding lead line in the direction orthogonal to the separation direction that differs from the drawing direction.

20. The apparatus according to claim 15, wherein
the lead lines are arranged to be immovable relative to the stator core, and
the positioning jigs are moved in the direction opposite to the separation direction so that parts of the lead lines closer to basal portions than longitudinally central parts of the lead lines are inserted into the restraining portions and so that parts of the lead lines inserted into the restraining portions are aligned with the connecting portions in the radial direction and the circumferential direction, and the positioning jigs are then moved toward the substrate along the axial direction to align the distal portions with the connecting portions in the radial direction and the circumferential direction.

21. The apparatus according to claim 15, wherein
the coils are each wound around the corresponding tooth in a concentrated winding,
each of the coils includes two of the lead lines, one at a winding-initiating end and the other at a winding-terminating end, and the two lead lines respectively extend from two circumferential sides of the corresponding tooth,
the substrate includes the connecting portions, the number of which is twice the number of the coils,
each of the connecting portions is a hole extending through the substrate in the thickness direction,
the number of lead lines is twice the number of the coils, and the lead lines are arranged at equal angular intervals along the circumferential direction,
the connecting portions, the number of which is twice the number of the coils, are arranged at equal angular intervals along the circumferential direction,
the number of the positioning jigs is equal to the number of the teeth,
each of the positioning jigs includes two of the restraining portions each receiving the two lead lines extending from the corresponding tooth.

22. The apparatus according to claim 15, wherein the positioning jigs each include a stopper that prevents the lead line received in the restraining portion from moving out of the restraining portion.

* * * * *